(12) United States Patent
Onojima (10) Patent No.: US 7,903,236 B2
(45) Date of Patent: Mar. 8, 2011

(54) OPTICAL MEMBER DRIVING APPARATUS FOR LASER RADAR

(75) Inventor: Noboru Onojima, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 229 days.

(21) Appl. No.: 12/187,242

(22) Filed: Aug. 6, 2008

(65) Prior Publication Data

US 2009/0086188 A1   Apr. 2, 2009

(30) Foreign Application Priority Data

Aug. 7, 2007   (JP) .................................. 2007-204893
Apr. 21, 2008  (JP) .................................. 2008-110523
Jun. 13, 2008  (JP) .................................. 2008-155623

(51) Int. Cl.
*G01C 3/08* (2006.01)

(52) U.S. Cl. ...................... 356/5.01; 356/5.02; 356/5.03; 356/5.1; 356/5.15

(58) Field of Classification Search ........ 356/3.01–3.15, 356/4.01–4.1, 5.01–5.15, 6–22
See application file for complete search history.

(56) References Cited

U.S. PATENT DOCUMENTS

2006/0033674 A1* 2/2006 Essig et al. ..................... 343/912
2007/0269199 A1* 11/2007 Mori et al. ..................... 396/322

FOREIGN PATENT DOCUMENTS

JP   2005-181114   7/2005

* cited by examiner

*Primary Examiner* — Thomas H Tarcza
*Assistant Examiner* — Luke D Ratcliffe
(74) *Attorney, Agent, or Firm* — Fish & Richardson P.C.

(57) ABSTRACT

An optical-member driving apparatus for laser radar, comprising: an optical-member integrated portion including an optical member and an optical-member mounted portion having the optical member mounted thereon; first erection members supporting the optical-member integrated portion; a relay portion to which the first erection members is connected; second erection members supporting the relay portion; and a fixed portion to which the second erection members are connected.

12 Claims, 4 Drawing Sheets

OPTICAL MEMBER DRIVING APPARATUS FOR LASER RADAR

CROSS-REFERENCE TO RELATED APPLICATIONS

This application claims the benefit of priority to Japanese Patent Application Nos. 2007-204893, 2008-110523 and 2008-155623, filed Aug. 7, 2007, Apr. 21, 2008 and Jun. 13, 2008, respectively, of which full contents are incorporated herein by reference.

BACKGROUND OF THE INVENTION

1. Field of the Invention

The present invention relates to an optical member driving apparatus for laser radar, incorporated in a mobile body such as an automobile, which is used for a laser radar device capable of measuring a distance to a target.

2. Description of the Related Art

Laser radar is considered to oscillate a laser beam and detect the laser beam, to measure an azimuth or a distance to a target object, for example. Laser is an abbreviation of "light amplification by stimulated emission of radiation". A conventional technology related to the laser radar is shown in, for example, a preceding vehicle detecting device for detecting a preceding vehicle ahead of one's own vehicle with the use of a scanning laser radar and the control method of the device (See, e.g., Japanese Patent Application Laid-Open Publication No. 2005-181114 (page 3, FIGS. 1 to 10).

Laser radar driving device includes, for example, a laser radar driving device that has a lens mounted portion including a lens, which allows a laser beam to pass therethrough, moved in the lateral direction or longitudinal direction by a plurality of "leaf springs" (none of which is shown).

However, it has been difficult to improve performance of the laser radar driving device, to reduce the size of the laser radar driving device, and to lower the price of the laser radar driving device. For example, it has been difficult to further improve the performance of the laser radar driving device including the "leaf spring", to reduce the size of the laser radar driving device including the "leaf spring", or to lower the price of the laser radar driving device including the "leaf spring".

For example, in the laser radar driving device including the "leaf spring", it is difficult to reduce the price of the "leaf spring" mainly, and therefore, the price of the laser radar driving device can not be lowered easily. Thus, it has been difficult to provide a driving device for laser radar with a lower price and capable of driving with accuracy, for example.

SUMMARY OF THE INVENTION

An optical-member driving apparatus for laser radar according to an aspect of the present invention, comprises: an optical-member integrated portion including an optical member and ah optical-member mounted portion having the optical member mounted thereon; first erection members supporting the optical-member integrated portion; a relay portion to which the first erection members is connected; second erection members supporting the relay portion; and a fixed portion to which the second erection members are connected.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

In an embodiment according to the present invention, performance of optical member driving apparatus for laser radar can be improved. An optical member and an optical-member integrated portion including an optical member mounted portion that is mounted with the optical member are supported by first erection members, and a relay portion to which the first erection members supporting the optical-member integrated portion is connected is supported by second erection members to be connected to a fixed portion. This enables the optical member and the optical-member integrated portion including the optical-member mounted portion that is mounted with the optical member, to be driven.

In an embodiment according to the present invention, the optical-member integrated portion is driven while being supported by the first erection members. The relay portion connected to the optical-member integrated portion by the first erection members is driven while being supported by the second erection members, so that the optical-member integrated portion is driven together with the relay portion.

In an embodiment according to the present invention, the optical-member integrated portion is driven while being reliably supported by a plurality of the first erection members disposed at a different angle. The relay portion reliably connected to the optical-member integrated portion by the plurality of first erection members is driven while being reliably supported by a plurality of the second erection members disposed at a different angle, so that the optical-member integrated portion is driven together with the relay portion.

In an embodiment according to the present invention, the optical member and the optical-member integrated portion including the optical-member mounted portion that is mounted with the optical member are reliably driven substantially in the lateral direction. When a force substantially in the lateral direction is applied to the optical-member integrated portion, the first erection members are bent flexibly, so that the optical-member integrated portion is reliably driven substantially in the lateral direction. Since the relay portion and the fixed portion are connected by the second erection members exerting high rigidity to the force substantially in the lateral direction, it can be avoided that the relay portion is shaken to move substantially in the lateral direction due to the lateral movement etc. of the optical-member integrated portion when this integrated portion is driven substantially in the lateral direction.

In an embodiment according to the present invention, the optical member, the optical-member integrated portion including the optical-member mounted portion having the optical member mounted thereon, and the relay portion connected to the optical-member integrated portion by the first erection members are reliably driven substantially in the longitudinal direction. When the force substantially in the longitudinal direction is applied to the relay portion, the second erection members are bent flexibly, so that the relay portion connected to the optical-member integrated portion by the first erection members is reliably driven substantially in the longitudinal direction. Since the relay portion and the optical-member integrated portion are connected by the first erection members exerting high rigidity to the force substantially in the longitudinal direction, when the optical-member integrated portion is driven substantially in the longitudinal direction, the optical-member integrated portion moves longitudinally together with the relay portion connected to the optical-member integrated portion by the first erection members.

In an embodiment according to the present invention, when the optical-member integrated, portion is driven substantially in the lateral direction, the optical-member integrated portion can be reliably driven substantially in the lateral direction. When the optical-member driving structure for laser radar including the first erection members and the second erection members is viewed from above, since the relay portion and the fixed portion are connected by the plurality of second erection members extending between the relay portion and the fixed portion substantially in a truncated chevron state, the relay portion is connected to the fixed portion in a state resistant to movement substantially in the lateral direction. When the optical-member integrated portion is driven substantially in the lateral direction, the optical-member integrated portion is reliably driven substantially in the lateral direction while being supported longitudinally by the plurality of first erection members substantially parallel in a plan view connecting the optical-member integrated portion and the relay portion.

In an embodiment according to the present invention, when the optical-member integrated portion is driven substantially in the longitudinal direction, the optical-member integrated portion can be reliably driven substantially in the longitudinal direction. When the optical-member driving structure for laser radar including the first erection members and the second erection members is viewed from the side, since the optical-member integrated portion and the relay portion are connected by the plurality of first erection members extending between the optical-member integrated portion and the relay portion substantially in a truncated chevron state, the optical-member integrated portion is connected to the relay portion in a state resistant to movement substantially in the longitudinal direction. When the optical-member integrated portion is driven substantially in the longitudinal direction, the relay portion connected to the optical-member integrated portion by the plurality of first erection members is reliably driven substantially in the longitudinal direction together with the optical-member integrated portion while being supported vertically by the plurality of second erection members substantially in parallel on the side view connecting the relay portion and the fixed portion.

In an embodiment according to the present invention, there can be reduced a size of the optical member driving apparatus for laser radar. Since the optical member driving apparatus for laser radar is configured such that the optical-member integrated portion is located on the front side, the relay portion is located on the rear side, and the fixed portion is located between the optical-member integrated portion and the relay portion, there can be avoided an increase in size of the optical member driving apparatus for laser radar, and the optical member driving apparatus for laser radar can be kept within a required minimum space.

In an embodiment according to the present invention, there can be reduced the price of the optical member driving apparatus for laser radar. In the conventional optical member driving apparatus for laser radar provided with a leaf spring, it is difficult to reduce the price mainly of the leaf spring, for example. Thus the price of the optical member driving apparatus for laser radar can not be reduced easily. However, material costs can be lowered by using a suspension wire formed substantially in a linear state as the erection member, instead of the leaf spring. By reduction of the material costs, the price of the optical member driving apparatus for laser radar can be reduced.

Directions of the optical member driving apparatus 1 for laser radar will be described. A side on which the optical members 6, 7 are located is referred to as the front side of the optical member driving apparatus 1 for laser radar; a side on which the relay portion 20 is located is referred to as the rear side of the optical member driving apparatus 1 for laser radar; a side on which the first optical member 6 is located is referred to as the left side of the optical member driving apparatus 1 for laser radar; a side on which the second optical member 7 is located is referred to as the right side of the optical member driving apparatus 1 for laser radar; a side on which a first fixed portion 30A is located is referred to as the upper side of the optical member driving apparatus 1 for laser radar; and a side on which a second fixed portion 30B is located is referred to as the lower side of the optical member driving apparatus 1 for laser radar.

Definitions such as "front", "rear", "left", "right", "upper", "lower" and the like in this description are definitions for convenience in order to describe the optical member driving apparatus 1 for laser radar. The optical member driving apparatus 1 for laser radar shown in FIGS. 1 to 4 is drawn for convenience so that each part of the optical member driving apparatus 1 for laser radar can be understood easily.

As a light emitting element (not shown) emitting laser light, etc., there is used a laser diode (LD), etc., capable of emitting infrared laser light or near infrared laser light with a wavelength of approximately 770 to 1200 nm, for example. The infrared laser light or near infrared laser light is preferably emitted as pulse light, for example, for use. The optical-member integrated portion 10 including the optical members 6, 7 is driven in directions D1 and D2 substantially longitudinal to an optical axis direction D0 of the infrared laser light or near infrared laser light passing through the optical members 6 and 7.

As shown in FIGS. 1 to 4, the optical member driving apparatus 1 for laser radar comprises: the plurality of optical members 6 and 7 through which light passes; the optical-member mounted portion 11 that mounted with the plurality of optical members 6 and 7; the optical-member integrated portion 10 including a plurality of first coils 12A, 12B, 12C, 12D, 12E, and 12F mounted on the optical-member mounted portion 11; a plurality of first magnetic members (not shown) corresponding to the plurality of the first coils 12A, 12B, 12C, 12D, 12E, and 12F mounted on the optical-member integrated portion 10, a plurality of first erection members 15A, 15B, 15C, 15D, 15E, 15F, 15G, 15H, 15I, 15J, 15K, and 15L for driving in a first direction (D1), which elastically support the optical-member mounted portion 11 of the optical-member integrated portion 10 via a plurality of first adhesives 13, etc.; the relay portion 20 including a relay portion body 21 to which each of the first erection members 15A, 15B, 15C, 15D, 15E, 15F, 15G, 15H, 15I, 15J, 15K, and 15L extending rearward from the optical-member mounted portion 11 of the optical-member integrated portion 10 is elastically connected via a plurality of second adhesives 23, etc.; a plurality of second coils 22A and 22B mounted on the relay portion body 21; a plurality of second magnetic members (not shown) corresponding to the plurality of second coils 22A and 22B mounted on the relay portion 20; a plurality of second erection members 25A, 25B, 25C, 25D, 25E, 25F, 25G, and 25H for driving in a second direction (D2), which extend frontward from the relay portion 20 and elastically support the relay portion 20 via a plurality of third adhesives 33, etc.; a fixed portion 30A on the upper side including a fixed portion body 31A to which each of the plurality of second erection members 25A, 25B, 25C, and 25D disposed on the upper side is elastically connected via a plurality of fourth adhesives 43, etc.; a fixed portion 30B on the lower side including a fixed portion body 31B to which each of the plurality of second erection members 25E, 25F, 25G, and 25H disposed on the lower side is elastically connected via the fourth adhesives 43, etc.; and a magnetic connection member (not shown) on which each of the first magnetic members and each of the second magnetic members are mounted.

As the optical members 6 and 7, there are used transparent or translucent lenses 6 and 7 made of synthetic resin, for example. Also, as the lenses 6 and 7, there are used Fresnel lenses 6 and 7 formed substantially in a rectangular flat plate on a front view, for example. The Fresnel lens is a lens that is formed into a thin plate but can enlarge an object, for example.

As the optical-member integrated portion 10, there is used the lens integrated portion 10 provided with the lenses 6 and 7, for example. As the optical-member mounted portion 11 making up the optical-member integrated portion 10, there is used the lens holder 11 made of synthetic resin formed, into a flat plate substantially in a shape of "H" turned sideways on a front view, for example. The lenses 6 and 7 are fixed to the lens holder 11 (the optical-member mounted portion 11) by using an adhesive such as an electron beam curing adhesive which is cured in a short time by irradiation of an electron beam such as an Ultraviolet ray, for example.

As the magnetic member, not shown, there is used a magnet formed in a flat plate substantially in a rectangle on a front view by using a magnet/magnetic steel, for example.

As the coils 12A, 12B, 12C, 12D, 12E, 12F, 22A, and 22B, there are used substantially rectangular annular coils 12A, 12B, 12C, 12D, 12E, 12F, 22A, and 22B on a front view each of which are made up by winding a small-diameter metal wire, for example.

As the adhesives 13, 23, 33, and 43, there are used the electron beam curing adhesives 13, 23, 33, and 43 which promote curing in a short time by irradiation of the electron beam such as an ultraviolet ray, for example.

As the erection members 15A, 15B, 15C, 15D, 15E, 15F, 15G, 15H, 15I, 15J, 15K, 15L, 25A, 25B, 25C, 25D, 25E, 25F, 25G, and 25H, there are used the metal suspension wires 15A, 15B, 15G, 15D, 15E, 15F, 15G, 15H, 15I, 15J, 15K, 15L, 25A, 25B, 25C, 25D, 25E, 25F, 25G, and 25H formed substantially in the linear state, for example.

On the left side of the optical member driving apparatus 1 for laser radar, there are disposed six pieces of first suspension wires 15A, 15B, 15C, 15G, 15H, and 15I on the upper side and lower side, which connect the left side of the optical-member integrated portion 10 and the left side of the relay portion 20. On the right side of the optical member driving apparatus 1 for laser radar, there are disposed six pieces of first suspension wires 15D, 15E, 15F, 15J, 15K, and 15Ld on the upper side and lower side, which connect the right side of the optical-member integrated portion 10 and the right side of the relay portion 20. On the upper side of the optical member driving apparatus 1 for laser radar, there are disposed four pieces of the second suspension wires 25A, 25B, 25C, and 25D connecting the upper side of the relay portion 20 and the upper fixed portion 30A. On the lower side of the optical member driving apparatus 1 for laser radar, there are disposed four pieces of the second suspension wires 25E, 25F, 25G, and 25H connecting the lower side of the relay portion 20 and the lower fixed portion 30B.

As the relay portion 20, there is used the intermediate support portion 20 located substantially at the intermediate part of the support structure, for example. As the relay portion body 21 making up the relay portion 20, there is used the intermediate support portion body 21 made of synthetic resin, which is formed into a flat plate substantially in a square shape on a rear view, for example.

As the fixed portions 30A and 30B, there are used a plurality of PWB 30A, 30B provided with a circuit conductor (not shown), for example. The PWB is abbreviation of "printed wired board" or "printed wiring board" and refers to a circuit board. As the fixed portion bodies 31A and 31B making up the fixed portions 30A and 30B, there are used the PWB bodies 31A and 31B of a flat plate substantially in a rectangle shape on a front view, which is made of synthetic resin, for example. In the optical member driving apparatus 1 for laser radar shown in FIGS. 1 to 4, portions other than the fixed portions 30A and 30B make up a movable part.

As the magnetic connection members, not shown, there is used a metal yoke also having a function of a frame, for example. The "yoke" refers to an object structurally supporting magnetic connection, for example. The "yoke" is considered as an object which reduces leakage of a magnetic force generated from the magnetic member such as a magnet. The "frame" refers to a frame, a framework, or a skeleton, for example.

As the optical member driving apparatus 1 for laser radar, there is used the lens driving mechanism 1 for laser radar which can controls each of the lenses 6 and 7 substantially in the lateral direction D1 and/or the longitudinal direction D2, for example. The optical-member driving mechanism 1 such as the lens driving mechanism 1 is made up as an actuator, for example. The "actuator" refers to a driving device converting energy into a parallel motion or a rotary motion, for example. The optical member driving apparatus 1 for laser radar such as the lens driving mechanism 1 for laser radar is provided for a driving device for laser radar.

The lens integrated portion 10, including the plurality of lenses 6 and 7 that light passes through, the lens holder 11 that is mounted with the plurality of lenses 6 and 7, and the plurality of first coils 12A, 12B, 12C, 12D, 12E and 12F mounted on the lens holder 11, is elastically supported by the plurality of first suspension wires 15A, 15B, 15C, 15D, 15E, 15F, 15G, 15H, 15I, 15J, 15K, and 15L for driving in the first direction (D1).

One end of each of the first suspension wires ISA, 15B, 15C, 15D, 15E, 15F, 15G, 15H, 15I, 15J, 15K, and 15L is attached to the lens holder 11 of the lens integrated portion 10 by each of the first adhesives 13, etc. The other end of each of the first suspension wires 15A, 15B, 15C, 15D, 15E, 15F, 15G, 15H, 15I, 15J, 15K, and 15L is attached to the intermediate support portion body 21 (relay portion body 21) of the intermediate support portion 20 (relay portion 20) by each of the second adhesives 23, etc.

The upper left side of the lens holder 11 of the lens integrated portion 10 and the upper left side of the intermediate support portion body 21 of the intermediate support portion 20 are connected by three pieces of the first suspension wires 15A, 15B, and 15C. The upper right side of the lens holder 11 of the lens integrated portion 10 and the upper right side of the intermediate support portion body 21 of the intermediate support portion 20 are connected by three pieces of the first suspension wires 15D, 15E, and 15F. The lower left side of the lens holder 11 of the lens integrated portion 10 and the lower left side of the intermediate support portion body 21 of the intermediate support portion 20 are connected by three pieces of the first suspension wires 15G, 15H, and 15I. The lower right side of the lens holder 11 of the lens integrated portion 10 and the lower right side of the intermediate support portion body 21 of the intermediate support portion 20 are connected by three pieces of the first suspension wires 15J, 15K, and 15L. The lens holder 11 of the lens integrated portion 10 and the intermediate support portion body 21 of the intermediate support portion 20 are connected by 12 pieces in total of the first suspension wires 15A, 15B, 15C, 15D, 15E, 15F, 15G, 15H, 15I, 15J, 15K, and 15L.

The intermediate support portion 20 including the intermediate support portion body 21, to which the plurality of first suspension wires 15A, 15B, 15C, 15D, 15E, 15F, 15G, 15H, 15I, 15J, 15K, 15L for driving in the first direction (D1) supporting the lens integrated portion 10 are elastically connected, is elastically supported by the plurality of second upper suspension wires 25A, 25B, 25C, and 25D for driving in the second direction (D2) and elastically connected to the PWB body 31A making up the PWB 30A on the upper side.

The intermediate support portion 20 including the intermediate support portion body 21, to which the plurality of first suspension wires 15A, 15B, 15C, 15D, 15E, 15F, 15G, 15H, 15I, 15J, 15K, 15L for driving in the first direction (D1) supporting the lens integrated portion 10 are elastically connected, is elastically supported by the plurality of second lower suspension wires 25E, 25F, 25G, and 25H for driving in the second direction (D2) and elastically connected to the PWB body 31B making up the PWB 30B on the lower side.

The intermediate support portion 20 has the plurality of second coils 22A and 22B mounted on the intermediate support portion body 21.

One end of each of the second suspension wires 25A, 25B, 25C, 25D, 25E, 25F, 25G, and 25H is attached to the intermediate support portion body 21 of the intermediate support portion 20 by each of the third adhesives 33, etc. The other end of each of the upper second suspension wires 25A, 25B, 25C, and 25D is attached to the PWB body 31A of the upper PWB 30A by each of the fourth adhesives 43, etc. The other end of each of the lower second suspension wires 25E, 25F, 25G, and 25H is attached to the PWB body 31B of the lower PWB 30B by each of the fourth adhesives 43, etc.

The upper side of the intermediate support portion body 21 of the intermediate support portion 20 and the PWB body 31A of the upper PWB 30A are connected by four pieces in total of the upper second suspension wires 25A, 25B, 25C, and 25D. The lower side of the intermediate support portion body 21 of the intermediate support portion 20 and the PWB body 31B of the lower PWB 30B are connected by four pieces in total of the lower second suspension wires 25E, 25F, 25G, and 25H.

Each of first magnets corresponding to each of the first coils 12A, 12B, 12C, 12D, 12E, and 12F of the lens integrated portion 10 is provided at the yoke, while each of second magnets corresponding to each of the second coils 22A and 22B of the intermediate support portion 20 is provided at the yoke.

Performance of the lens driving mechanism 1 for laser radar is improved by making up the above lens driving mechanism 1 for laser radar. If the lens driving mechanism 1 for laser radar is configured as above, when the first coils 12A, 12B, 12C, 12D, 12E, and 12F mounted on the lens holder 11 of the lens integrated portion 10 are energized, the lens integrated portion 10, including the plurality of lenses 6 and 7 that light passes through, the lens holder 11 that mounted with the plurality of lenses 6 and 7, the plurality of first coils 12A, 12B, 12C, 12D, 12E, and 12F mounted on the lens holder 11, and the plurality of first adhesives 13 adhering to the lens holder 11, can be driven substantially in the lateral direction D1.

When the second coils 22A and 22B mounted on the intermediate support portion body 21 of the intermediate support portion 20 are energized, both of the intermediate support portion 20, including the plurality of second coils 22A and 22B mounted on the intermediate support portion body 21, the plurality of second adhesives 23 adhering to the intermediate support portion body 21, and the plurality of third adhesives 33 adhering to the intermediate support portion body 21, and the lens integrated portion 10, elastically connected to the intermediate support portion 20 by the first suspension wires 15A, 15B, 15C, 15D, 15E, 15F, 15G, 15H, 15I, 15J, 15K, and 15L, can be driven substantially in the longitudinal direction D2.

When the lens integrated portion 10 is to be driven substantially in the first direction D1, i.e., the lateral direction D1, the first coils 12A, 12B, 12C, 12D, 12E, and 12F are energized. When the intermediate support portion 20, to which the lens integrated portion 10 is connected via the first suspension wires 15A, 15B, 15C, 15D, 15E, 15F, 15G, 15H, 15I, 15J, 15K, and 15L, is to be driven substantially in the second direction D2, i.e., the longitudinal direction D2, the second coils 22A and 22B are energized.

The end portions (not shown) of the first coils 12A, 12B, 12C mounted on the upper side of the lens holder 11 of the lens integrated portion 10 and the one end portions of the first suspension wires 15A, 15B, 15C, 15D, 15E, and 15F attached to the upper side of the lens holder 11 of the lens integrated portion 10 are connected electrically by using a solder material (not shown), for example.

The end portions (not shown) of the first coils 12D, 12E, and 12F mounted on the lower side of the lens holder 11 of the lens integrated portion 10 and the one end portions of the first suspension wires 15G, 15H, 15I, 15J, 15K, and 15L attached to the lower side of the lens holder 11 of the lens integrated portion 10 are connected electrically by using a solder material (not shown), for example.

The other end portions of the first suspension wires 15A, 15B, and 15C on the upper left side formed by Using a conductor are connected electrically to the one end portion of the second suspension wire 25A on the upper left formed by using a conductor through, for example, a solder material (not shown), a short wire for coil (not shown) containing light metals such as an aluminum material or an aluminum alloy material, or a circuit conductor (not shown), etc. provided at the intermediate support portion body 21 of the intermediate support portion 20.

The other end portions of the first suspension wires 15D, 15E, and 15F on the upper right side formed by using a conductor are connected electrically to the one end portion of the second suspension wire 25D on the upper right side formed by using a conductor through, for example, a solder material (not shown), a short wire for coil (not shown) containing light metals such as an aluminum material or an aluminum alloy material, or a circuit conductor (not shown), etc., provided at the intermediate support portion body 21 of the intermediate support portion 20.

The other end portions of the first suspension wires 15G, 15H, and 15I on the lower left side formed by using a conductor are connected electrically to the one end portion of the second suspension wire 25E on the lower left side formed by using a conductor through a solder material (not shown), a short wire for coil (not shown) containing light metals such as an aluminum material or an aluminum alloy material, or a circuit conductor (not shown), etc., provided at the intermediate support portion body 21 of the intermediate support portion 20.

The other end portions of the first suspension wires 15J, 15K, and 15L on the lower right side formed by using a conductor are connected electrically to the one end portion of the second suspension wife 25H on the lower right side formed by using a conductor through a solder material (not shown), a short wire for coil (not shown) containing light metals such as an aluminum material or an aluminum alloy material, or a circuit conductor (not shown), etc., provided at the intermediate support portion body 21 of the intermediate support portion 20.

The end portion (not shown) of the upper second coil 22A mounted on the intermediate support portion body 21 of the intermediate support portion 20 and the one end portions of the upper second suspension wires 25B and 25C mounted on the intermediate support portion body 21 of the intermediate support portion 20 are connected electrically by using a solder material (not shown), for example.

The end portion (not shown) of the lower second coil 22B mounted on the intermediate support portion body 21 of the intermediate support portion 20 and the one end portions of the lower second suspension wires 25F and 25G mounted on the intermediate support portion body 21 of the intermediate support portion 20 are connected electrically by using a solder material (not shown), for example.

The other end portions of the upper second suspension wires 25A, 25B, 25C, and 25D formed by using a conductor are connected electrically to a circuit conductor, not shown, provided at the PWB body 31A of the upper PWB 30A through a solder material (not shown), for example.

The other end portions of the lower second suspension wires 25E, 25F, 25G, and 25H formed by using a conductor are connected electrically to a circuit conductor, not shown, provided at the PWB body 31B of the lower PWB 30B through a solder material (not shown), for example.

Each of the suspension wires 15A, 15B, 15C, 15D, 15E, 15F, 15G, 15H, 15I, 15J, 15K, 15L, 25A, 25B, 25C, 25D, 25E, 25F, 25G, and 25H is formed as a support body also functioning as a conductor, for example.

The entire rigidity in the lateral/longitudinal directions D1/D2 in the plurality of first suspension wires 15A, 15B, 15C, 15D, 15E, 15F, 15G, 15H, 15I, 15J, 15K, and 15L elastically connecting the lens integrated portion 10 and the intermediate support portion 20 is different from the entire rigidity in the lateral/longitudinal directions D1/D2 in the plurality of second suspension wires 25A, 25B, 25C, 25D, 25E, 25F, 25G, and 25H elastically connecting the intermediate support portion 20 and each of the PWBs 30A and 30B. The lateral/longitudinal directions mean at least one of the lateral and longitudinal directions.

Therefore, the lens integrated portion 10 is driven substantially in the lateral direction D1 while being elastically supported by the first suspension wires 15A, 15B, 15C, 15D, 15E, 15F, 15G, 15H, 15I, 15J, 15K, and 15L. Since the intermediate support portion 20 elastically connected to the lens integrated portion 10 by the first suspension wires 15A, 15B, 15G, 15D, 15E, 15F, 15G, 15H, 15I, 15J, 15K, and 15L is driven substantially in the longitudinal direction D2 while being elastically supported by the second suspension wires 25A, 25B, 25C, 25D, 25E, 25F, 25G, and 25H, the lens integrated portion 10 is driven substantially in the longitudinal direction D2 together with the intermediate support portion 20.

The lens integrated portion 10 and the intermediate support portion 20 are connected by the plurality of first suspension wires 15A, 15B, 15C, 15D, 15E, 15F, 15G, 15H, 15I, 15J, 15K, and 15L, and each of the first suspension wires 15A, 15B, 15C, 15D, 15E, 15F, 15G, 15H, 15I, 15J, 15K, and 15L is disposed at a different angle. The intermediate support portion 20 and each of the PWBs 30A and 30B are connected by the plurality of second suspension wires 25A, 25B, 25C, 25D, 25E, 25F, 25G, 25H, and each of the second suspension wires 25A, 25B, 25C, 25D, 25E, 25F, 25G, and 25H is disposed at a different angle.

Figure 4:
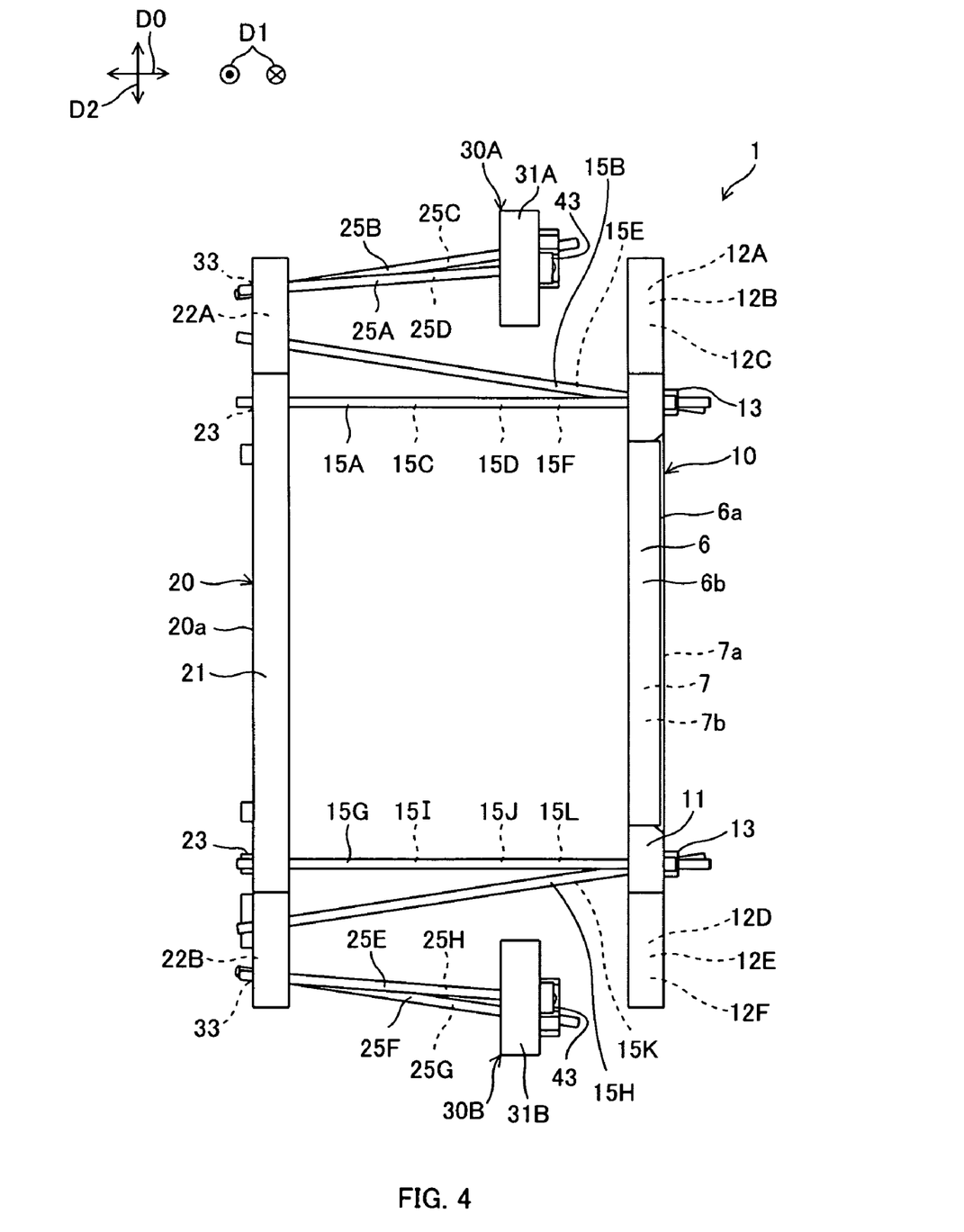
FIG. 4 is a side view showing an optical member driving apparatus for laser radar according to an embodiment of the present invention.

To describe specifically, as shown in FIG. 4, when the lens driving structure 1 for laser radar is viewed from the side, each of the inclined first suspension wires 15B and 15H connecting the lens integrated portion 10 and the intermediate support portion 20 is disposed at a different angle. When the lens driving structure 1 for laser radar is viewed from the side, each of the inclined first suspension wires 15E and 15K connecting the lens integrated portion 10 and the intermediate support portion 20 is disposed at a different angle.

When the lens driving structure 1 for laser radar is viewed from the side, the substantially horizontal first suspension wires 15A and 15C, connecting the lens integrated portion 10 and the intermediate support portion 20, and the inclined first suspension wire 15B are disposed at different angles. When the lens driving structure 1 for laser radar is viewed from the side, the substantially horizontal first suspension wires 15D and 15F, connecting the lens integrated portion 10 and the intermediate support portion 20, and the inclined first suspension wire 15E are disposed at different angles. When the lens driving structure 1 for laser radar is viewed from the side, the substantially horizontal first suspension wires 15G and 15I, connecting the lens integrated portion 10 and the intermediate support portion 20, and the inclined first suspension wire 15H are disposed at different angles. When the lens driving structure 1 for laser radar is viewed from the side, the substantially horizontal first suspension wires 15J and 15L, connecting the lens integrated portion 10 and the intermediate support portion 20, and the inclined first suspension wire 15K are disposed at different angles.

Figure 1:
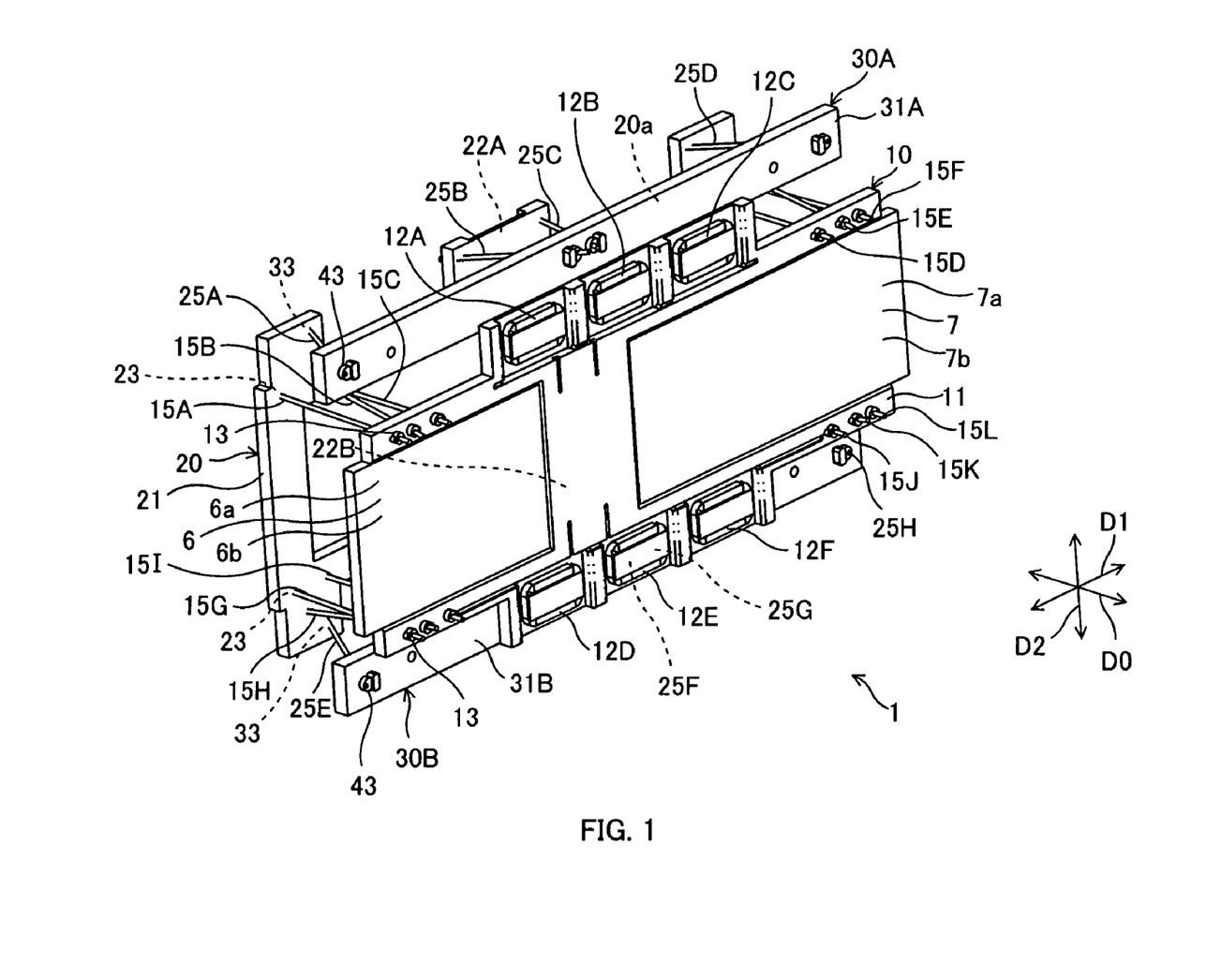
FIG. 1 is a perspective view showing an optical member driving apparatus for laser radar according to an embodiment of the present invention.
Figure 2:
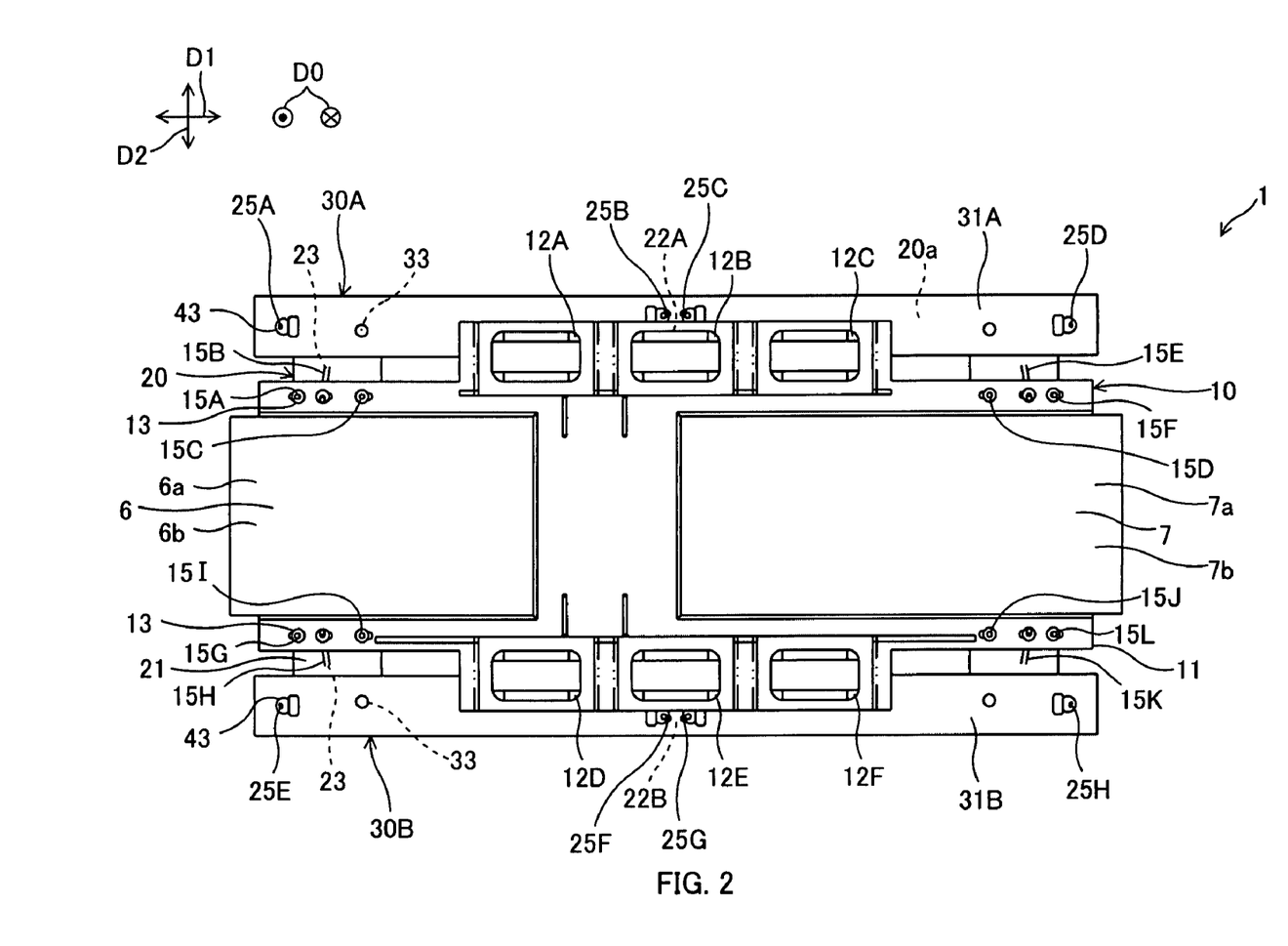
FIG. 2 is a front view showing an optical member driving apparatus for laser radar according to ah embodiment of the present invention.
Figure 3:
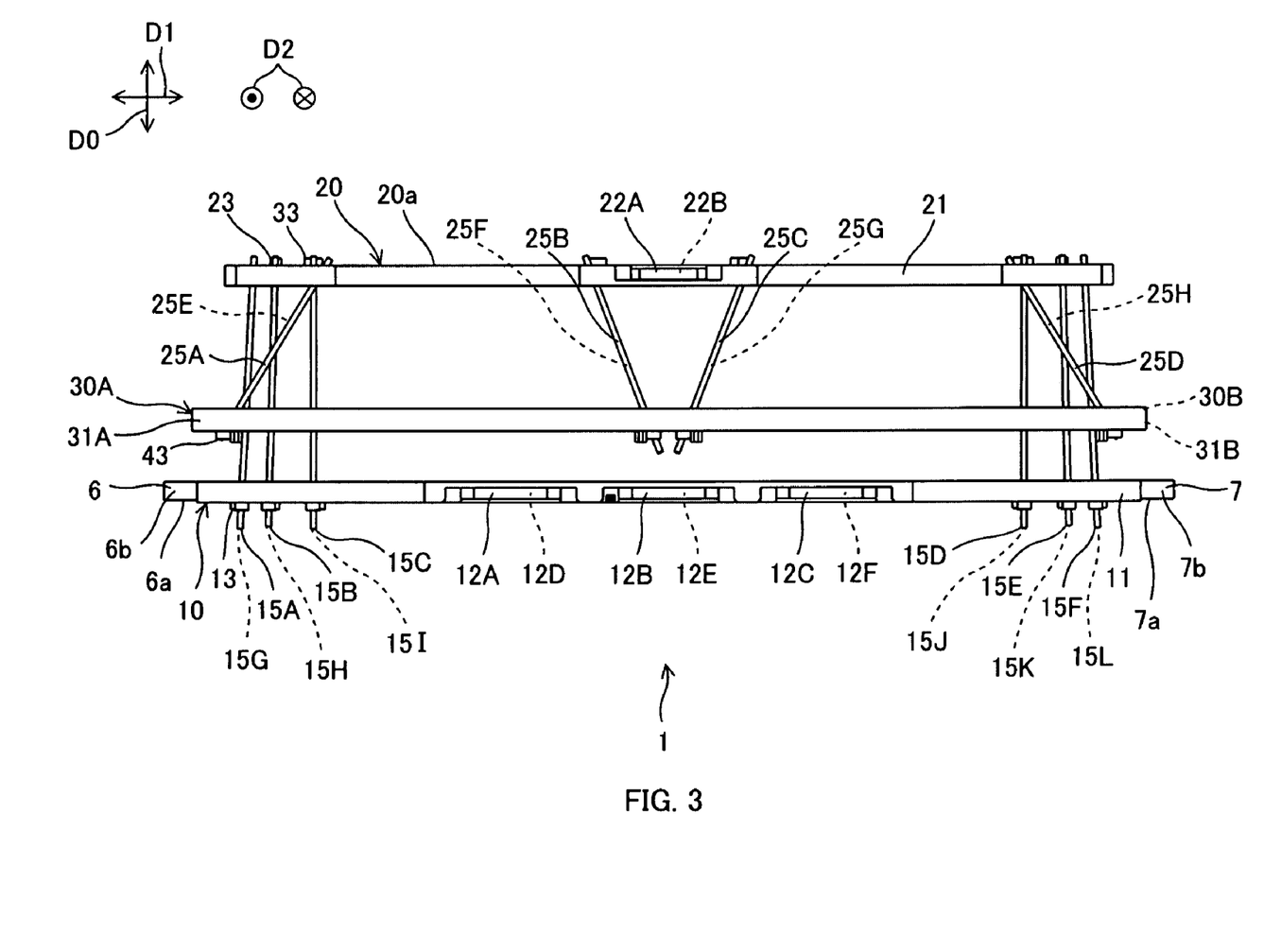
FIG. 3 is a plan view showing an optical member driving apparatus for laser radar according to an embodiment of the present invention.

As shown in FIG. 3, when the lens driving structure 1 for laser radar is viewed from above, each of the inclined second suspension wires 25A and 25B connecting the intermediate support portion 20 and the upper PWB 30A is disposed at a different angle. When the lens driving structure 1 for laser radar is viewed from above, each of the inclined second suspension wires 25C and 25D connecting the intermediate support portion 20 and the upper PWB 30A is disposed at a different angle, when the lens driving structure 1 for laser radar is viewed from above, each of the inclined second suspension wires 25E and 25F connecting the intermediate support portion 20 and the lower PWB 30B is disposed at a different angle. When the lens driving structure 1 for laser radar is viewed from above, each of the inclined second suspension wires 25G and 25H connecting the intermediate support portion 20 and the lower PWB 30B is disposed at a different angle.

If the lens driving structure 1 for laser radar is made up as shown in FIGS. 1 to 4, the lens integrated portion 10 is driven substantially in the lateral direction D1 while being reliably supported by the plurality of first suspension wires 15A, 15B, 15C, 15D, 15E, 15F, 15G, 15H, 15I, 15J, 15K, and 15L disposed at different angles. Since the intermediate support portion 20 reliably connected to the lens integrated portion 10 by the plurality of first suspension wires 15A, 15B, 15C, 15D, 15E, 15F, 15G, 15H, 15I, 15J, 15K, and 15L is driven substantially in the longitudinal direction D2 while being reliably supported by the plurality of second suspension wires 25A, 25B, 25C, 25D, 25E, 25F, 25G, and 25H disposed at different angles, the lens integrated portion 10 is driven substantially in the longitudinal direction D2 together with the intermediate support portion 20.

The lens integrated portion 10 and the intermediate support portion 20 are elastically connected by the plurality of first suspension wires 15A, 15B, 15C, 15D, 15E, 15F, 15G, 15H, 15I, 15J, 15K, and 15L for driving in the lateral direction (D1), which have low rigidity, for example, against a force substantially in the lateral direction D1 and are bent flexibly when a driving force substantially in the lateral direction D1 is applied to the lens integrated portion 10. The intermediate support portion 20 and each of the PWB 30A and 30B are connected by the plurality of second suspension wires 25A, 25B, 25C, 25D, 25E, 25F, 25G, and 25H for driving in the longitudinal direction (D2), which exerts high rigidity against the force substantially in the lateral direction D1.

Therefore, the lens, integrated portion 10 including the plurality of lenses 6 and 7 that light passes through, the lens holder 11 that is mounted with the plurality of lenses 6 and 7, and the plurality of first coils 12A, 12B, 12C, 12D, 12E, and 12F mounted on the lens holder 11 is reliably driven substantially in the lateral direction D1.

When the first coils 12A, 12B, 12C, 12D, 12E, and 12F of the lens integrated portion 10 are energized to generate electromagnetic forces in their respective coils so that a driving force substantially in the lateral direction D1 is applied to the lens integrated portion 10 including the first coils 12A, 12B, 12C, 12D, 12E, and 12F, the lens integrated portion 10 is reliably driven substantially in the lateral direction D1 by virtue of the flexibility of the plurality of first suspension wires 15A, 15B, 15C, 15D, 15E, 15F, 15G, 15H, 15I, 15J, 15K, and 15L for driving in the lateral direction (D1).

Since the intermediate support portion 20 and each of the PWBs 30A and 30B are connected by the plurality of second suspension wires 25A, 25B, 25C, 25D, 25E, 25F, 25G, and 25H for driving in the longitudinal direction (D2), which exerts high rigidity against the force substantially in the lateral direction D1, it is avoided that the lateral movement, etc. of the lens integrated portion 10 causes the intermediate support portion 20 is shaken to move inadvertently substantially in the lateral direction D1 due to the lateral movement etc. of the lens integrated portion when this integrated portion is driven substantially in the lateral direction D1.

The lens integrated portion 10 and the intermediate support portion 20 are connected by the plurality of first suspension wires 15A, 15B, 15C, 15D, 15E, 15F, 15G, 15H, 15I, 15J, 15K, and 15L for driving in the lateral direction (D1), which exerts high rigidity against a force substantially in the longitudinal direction D2. The intermediate support portion 20 and each of the PWBs 30A and 30B are elastically connected by the plurality of second suspension wires 25A, 25B, 25C, 25D, 25E, 25F, 25G, and 25H for driving in the longitudinal direction (D2), which have low rigidity, for example, against the force substantially in the longitudinal direction D2 and are flexibly bent when a driving force substantially in the longitudinal direction D2 is applied to the intermediate support portion 20.

Therefore, the lens integrated portion 10 including the plurality of lenses 6 and 7 that light passes through, the lens holder 11 that is mounted with the plurality of lenses 6 and 7, and the plurality of first coils 12A, 12B, 12C, 12D, 12E, and 12F mounted on the lens holder 11 is reliably driven substantially in the longitudinal direction D2. The intermediate support portion 20, including the plurality of second coils 22A and 22B mounted oh the intermediate support portion body 21 and being connected to the lens integrated portion 10 by the first suspension wires 15A, 15B, 15C, 15D, 15E, 15F, 15G, 15H, 15I, 15J, 15K, and 15L, is reliably driven substantially in the longitudinal direction D2.

When the second coils 22A and 22B of the intermediate support portion body 21 are energized to generate the electromagnetic forces in their respective coils 22A and 22B so that a driving force substantially in the longitudinal direction D2 is applied to the intermediate support portion 20 including each of the second coils 22A and 22B, the intermediate support portion 20 connected to the lens integrated portion 10 by the first suspension wires 15A, 15B, 15C, 15D, 15E, 15F, 15G, 15H, 15I, 15J, 15K, 15L is reliably driven substantially in the longitudinal direction D2 by virtue of the flexibility of the plurality of second suspension wires 25A, 25B, 25C, 25D, 25E, 25F, 25G, and 25H for driving in the longitudinal direction (D2).

Since the intermediate support portion 20 and the lens integrated portion 10 are connected by the plurality of first suspension wires 15A, 15B, 15C, 15D, 15E, 15F, 15G, 15H, 15I, 15J, 15K, and 15L for driving in the lateral direction (D1), which exerts high rigidity against a force substantially in the longitudinal direction D2, when the lens integrated portion 10 is driven substantially in the longitudinal direction D2, the lens integrated portion 10 moves longitudinally along with the intermediate support portion 20, which is connected to the lens integrated portion 10 by the first suspension wires 15A, 15B, 15G, 15D, 15E, 15F, 15G, 15H, 15I, 15J, 15K, and 15L.

As shown in FIG. 3, when the lens driving structure 1 for laser radar, provided with the first suspension wires 15A, 15B, 15C, 15D, 15E, 15F, 15G, 15H, 15I, 15J, 15K, and 15L and the second suspension wires 25A, 25B, 25C, 25D, 25E, 25F, 25G, 25H, is viewed from above, by extending the plurality of first suspension wires 15A, 15B, 15C, 15D, 15E, 15F, 15G, 15H, 15I, 15J, 15K, and 15L for driving in the lateral direction (D1) substantially in parallel with on another between the lens integrated portion 10 and the intermediate support portion 20, the lens integrated portion 10 and the intermediate support portion 20 are elastically connected with the plurality of first suspension wires 15A, 15B, 15C, 15D, 15E, 15F, 15G, 15H, 15I, 15J, 15K, and 15L for driving in the lateral direction (D1).

When the lens driving structure 1 for laser radar, provided with the first suspension wires 15A, 15B, 15C, 15D, 15E, 15F, 15G, 15H, 15I, 15J, 15K, and 15L and the second suspension wires 25A, 25B, 25C, 25D, 25E, 25F, 25G, 25H, is viewed from above, by extending the plurality of second suspension wires 25A, 25B, 25C, 25D, 25E, 25F, 25G, and 25H for driving in the longitudinal direction (D2) in a substantially longitudinally truncated chevron state, for example, between the intermediate support portion 20 and each of the PWBs 30A and 30B, the intermediate support portion 20 and each of the PWBs 30A and S0B are connected with the plurality of second suspension wires 25A, 25B, 25C, 25D, 25E, 25F, 25G, and 25H for driving in the longitudinal direction (D2).

If the lens driving structure 1 for laser radar is configured as shown in FIGS. 1 to 4, when the lens integrated portion 10 is driven substantially in the lateral direction D1, the lens integrated portion 10 is reliably driven substantially in the lateral direction D1.

When the lens driving structure 1 for laser radar provided with the first suspension wires 15A, 15B, 15C, 15D, 15E, 15F, 15G, 15H, 15I, 15J, 15K, and 15L and the second suspension wires 25A, 25B, 25C, 25D, 25E, 25F, 25G, and 25H is viewed from above, by extending the plurality of second suspension wires 25A, 25B, 25C, 25D, 25E, 25F, 25G, and 25H for driving in the longitudinal direction (D2) in a substantially longitudinal truncated chevron state, for example, between the intermediate support portion 20 and each of the PWB 30A and 30B, the intermediate support portion 20 and each of the PWBs 30A and 30B are connected so that the intermediate support portion 20 is connected to each of the PWBs 30A and 30B in a state resistant to the movement substantially in the lateral direction D1.

When the lens integrated portion 10 is driven substantially in the lateral direction D1, the lens integrated portion 10 is elastically supported longitudinally by the plurality of first suspension wires 15A, 15B, 15C, 15D, 15E, 15F, 15G, 15H, 15I, 15J, 15K, and 15L for driving in the lateral direction (D1) substantially in parallel with one another in a plan view which elastically connect the lens integrated portion 10 and the intermediate support, portion 20, and is reliably driven substantially in the lateral direction D1.

As shown in FIG. 4, when the lens driving structure 1 for laser radar provided with the first suspension wires 15A, 15B, 15C, 15D, 15E, 15F, 15G, 15H, 15I, 15J, 15K, and 15L and the second suspension wires 25A, 25B, 25C, 25D, 25E, 25F, 25G, and 25H is viewed from the side, by extending the plurality of first suspension wires 15B, 15E, 15H, 15K for driving in the lateral direction (D1) inclined in a substantially laterally truncated chevron state, for example, between the lens integrated portion 10 and the intermediate support portion 20 and by extending the plurality of first suspension wires 15A, 15C, 15D, 15F, 15G, 15I, 15J, and 15L for driving in the lateral direction (D1) substantially horizontally and substantially in parallel with one another, the lens integrated portion 10 and the intermediate support portion 20 are connected with the plurality of first suspension wires 15A, 15B, 15C, 15D, 15E, 15F, 15G, 15H, 15I, 15J, 15K, and 15L for driving in the lateral direction (D1).

When the lens driving structure 1 for laser radar provided with the first suspension wires 15A, 15B, 15C, 15D, 15E, 15F, 15G, 15H, 15I, 15J, 15K, and 15L and the second suspension wires 25A, 25B, 25C, 25D, 25E, 25F, 25G, and 25H is viewed from the side, by extending the plurality of second suspension wires 25A, 25B, 25C, 25D, 25E, 25F, 25G, and 25H for driving in the longitudinal direction (D2) substantially in parallel between the intermediate support portion 20 and each of the PWBs 30A and 30b, the intermediate support portion 20 and each of the PWBs 30A and 30B are elastically connected via the plurality of second suspension wires 25A, 25B, 25C, 25D, 25E, 25F, 25G, and 25H for driving in the longitudinal direction (D2).

If the lens driving structure 1 for laser radar is configured as shown in FIGS. 1 to 4, when the lens integrated portion 10 is driven substantially in the longitudinal direction D2, the lens integrated portion 10 is reliably driven substantially in the longitudinal direction D2.

When the lens driving structure 1 for laser radar provided with the first suspension wires 15A, 15B, 15C, 15D, 15E, 15F, 15G, 15H, 15I, 15J, 15K, and 15L and the second suspension wires 25A, 25B, 25C, 25D, 25E, 25F, 25G, and 25H is viewed from the side, by extending the plurality of first suspension wires 15B, 15E, 15H, and 15K for driving in the lateral direction (D1) in a substantially laterally truncated chevron state, for example, between the lens integrated portion 10 and the intermediate support portion 20 and by extending the plurality of first suspension wires 15A, 15C, 15D, 15F, 15G, 15I, 15J, and 15L for driving in the lateral direction (D1) substantially horizontally and substantially in parallel, the lens integrated portion 10 and the intermediate support portion 20 are connected, and therefore, the lens integrated portion 10 is connected to the intermediate support portion 20 in a state resistant to the movement substantially in the longitudinal direction D2.

When the lens integrated portion 10 is driven substantially in the longitudinal direction D2, by the plurality of second suspension wires 25A, 25B, 25C, 25D, 25E, 25F, 25G, and 25H for driving in the longitudinal direction (D2) substantially in parallel in the side view elastically connecting the intermediate support portion 20 and each of the PWBs 30A and 30B, the intermediate support portion 20 elastically connected to the lens integrated portion 10 by the plurality of first suspension wires 15A, 15B, 15C, 15D, 15E, 15F, 15G, 15H, 15I, 15J, 15K, and 15L for driving in the lateral direction (D1) is reliably driven substantially in the longitudinal direction D2 together with the lens integrated portion 10, while being elastically supported longitudinally.

In a description, an inclined erection state of each of the first suspension wires 15B, 15E, 15H, and 15K and the inclined erection state of each of the second suspension wires 25A, 25B, 25C, 25D, 25E, 25F, 25G, and 25H are shown as "truncated chevron" state for convenience, however, the inclined erection state of each of the first suspension wires 15A, 15B, 15C, 15D, 15E, 15F, 15G, 15H, 15I, 15J, 15K, and 15L and the inclined erect ion state of each of the second suspension wires 25A, 25B, 25C, 25D, 25E, 25F, 25G, and 25H may be shown as substantially "slightly separated truncated chevron" state, substantially "separated truncated chevron" state, substantially "inverted separated truncated chevron" state, substantially "truncated chevron" or "inverted truncated chevron", substantially "<" state or substantially ">" state.

As shown in FIG. 3, when the lens driving structure 1 for laser radar is viewed from above, each of the second suspension wires 25A and 25B or 25C and 25D connecting the intermediate support portion 20 and the upper PWB 30A are disposed as two oblique sides constituting a trapezoid, for example. When the lens driving structure 1 for laser radar is viewed from above, each of the second suspension wires 25E and 25F or 25G and 25H connecting the intermediate support portion 20 and the lower PWB 30B are disposed as two oblique sides constituting a trapezoid, for example.

As shown in FIG. 4, when the lens driving structure 1 for laser radar is viewed from the side, each of the first suspension wires 15B and 15H or 15E and 15K connecting the lens integrated portion 10 and the intermediate support portion 20 are disposed as two oblique sides constituting a trapezoid, for example.

When the lens driving structure 1 for laser radar is viewed, from the side, each of the first suspension wires 15B and 15A or 15B and 15C connecting the lens integrated portion 10 and the intermediate support portion 20 are disposed as two long sides constituting a substantial right triangle, for example. When the lens driving structure 1 for laser radar is viewed from the side, each of the first suspension wires 15E and 15D or 15E and 15F connecting the lens integrated portion 10 and the intermediate support portion 20 are disposed as two long sides constituting a substantial right triangle, for example.

When the lens driving structure 1 for laser radar is viewed from the side, each of the first suspension wires 15H and 15G or 15H and 15I connecting the lens integrated portion 10 and the intermediate support portion 20 are disposed as two long sides constituting a substantial right triangle, for example. When the lens driving structure 1 for laser radar is viewed from the side, each of the first suspension wires 15K and 15J or 15K and 15L connecting the lens integrated portion 10 and the intermediate support portion 20 are disposed as two long sides constituting a substantial right triangle, for example.

The lens driving mechanism 1 for laser radar is supposed to have an irregular two-staged structure, for example, in which the lens integrated portion 10 is located on the front side, the intermediate support portion 20 is located on the rear side, and each of the PWBs 30A and 30B is located between the lens integrated portion 10 and the intermediate support portion 20.

Therefore, the lens driving mechanism 1 for laser radar is reduced in size and miniaturized. Since the lens driving mechanism 1 for laser radar is configured so as to have the irregular two-staged structure, for example, in which the lens integrated portion 10 is located on the front side, the intermediate support portion 20 is located on the rear side, and each of the PWBs 30A and 30B is located between the lens integrated portion 10 and the intermediate support portion 20, there is avoided an increase in size of the lens driving mechanism 1 for laser radar, thus the lens driving mechanism 1 for laser radar is kept in a required minimum space. By making up the lens driving mechanism 1 for laser radar as shown in FIGS. 1 to 4, a dimension between a front face 6a of a first Fresnel lens 6 or a front face 7a of a second Fresnel lens 7 mounted on the lens integrated portion 10 and a rear face 20a of the intermediate support portion 20 is kept within approximately 20 mm (millimeters).

As the first and/or second suspension wires 15A, 15B, 15C, 15D, 15E, 15F, 15G, 15H, 15I, 15J, 15K, and 15L/25A, 25B, 25C, 25D, 25E, 25F, 25G, and 25H, there are used metal suspension wires 15A, 15B, 15C, 15D, 15E, 15F, 15G, 15H, 15I, 15J, 15K, and 15L/25A, 25B, 25C, 25D, 25E, 25F, 25G, and 25H with a small diameter formed in a substantially linear state.

Therefore, price reduction of the lens driving mechanism 1 for laser radar is made possible. In a conventional lens driving mechanism for laser radar (not shown) including a substantial flat-plate leaf spring, it is difficult to reduce the price mainly of the substantial flat-plate leaf spring, for example, and therefore, the price reduction of the lens driving mechanism for laser radar has been difficult. However, material costs can be reduced by using the metal suspension wires 15A, 15B, 15C, 15D, 15E, 15F, 15G, 15H, 15I, 15J, 15K, and 15L/25A, 25B, 25C, 25D, 25E, 25F, 25G, and 25H with a small diameter formed in a substantially linear state, as the first and/or second suspension wires 15A, 15B, 15C, 15D, 15E, 15F, 15G, 15H, 15I, 15J, 15K, and 15L/25A, 25B, 25C, 25D, 25E, 25F, 25G, and 25H, instead of the substantial flat-plate leaf spring. Though the "leaf spring" is formed by a metal plate in a substantially planar shape, the suspension wires 15A, 15B, 15C, 15D, 15E, 15F, 15G, 15H, 15I, 15J, 15K, 15L, 25A, 25B, 25C, 25D, 25E, 25F, 25G, and 25H are formed by a metal wire in a substantially linear state, and therefore, an amount of metal material can be small, thus the material costs can be reduced accordingly. Since material costs are reduced, the price of the lens driving mechanism 1 for laser radar can be reduced.

The suspension wires 15A, 15B, 15C, 15D, 15E, 15F, 15G, 15H, 15I, 15J, 15K, 15L, 25A, 25B, 25C, 25D, 25E, 25F, 25G, and 25H substantially circular in cross section have a diameter of 0.06 to 0.1 mm, for example. Although the suspension wires 15A, 15B, 15C, 15D, 15E, 15F, 15G, 15H, 15I, 15J, 15K, 15L, 25A, 25B, 25C, 25D, 25E, 25F, 25G, and 25H shown in FIGS. 1 to 4 are expressed in a bold line for convenience, there are actually used the suspension wires 15A, 15B, 15C, 15D, 15E, 15F, 15G, 15H, 15I, 15J, 15K, 15L, 25A, 25B, 25C, 25D, 25E, 25F, 25G, and 25H with a small diameter of 0.06 to 0.1 mm.

With regard to a suspension wife with an extremely small diameter of less than 0.06 mm, there is fear that an accidental disconnection might occur, for example. A suspension wire with a large diameter of exceeding 0.1 mm is difficult to be flexibly bent, for example. For this reason, the suspension wires 15A, 15B, 15C, 15D, 15E, 15F, 15G, 15H, 15I, 15J, 15K, 15L, 25A, 25B, 25C, 25D, 25E, 25F, 25G, and 25H with a diameter of substantially 0.08 mm are preferably selected to be provided at the lens driving mechanism 1 for laser radar.

By selecting the suspension wires 15A, 15B, 15C, 15D, 15E, 15F, 15G, 15H, 15I, 15J, 15K, 15L, 25A, 25B, 25C, 25D, 25E, 25F, 25G, and 25H with a diameter of 0.06 to 0.1 mm, there is configured the inexpensive lens driving mechanism 1 for laser radar including the suspension wires 15A, 15B, 15C, 15D, 15E, 15F, 15G, 15H, 15I, 15J, 15K, 15L, 25A, 25B, 25C, 25D, 25E, 25F, 25G, and 25H that resist disconnection and can be flexibly bent.

A piano wire material specified based on "JIS G 3502", a piano wire specified based on "JIS G 3522" or a hard steel wire specified based on "JIS G 3521", for example, are used to form a wire making up either one or both of the suspension wires, which are first-direction drive suspension wires 15A, 15B, 15C, 15D, 15E, 15F, 15G, 15H, 15I, 15J, 15K, and 15L and second-direction drive suspension wires 25A, 25B, 25C, 25D, 25E, 25F, 25G, and 25H.

Either one or both of the suspension wires, which are lateral-direction drive suspension wires 15A, 15B, 15C, 15D, 15E, 15F, 15G, 15H, 15I, 15J, 15K, and 15L and the longitudinal-direction drive suspension wires 25A, 25B, 25C, 25D, 25E, 25F, 25G, and 25H are made up by using a conductor with copper plating for which plating processing is performed based on an electroplating method, for example. To be specific, a steel wire or a piano wire excellent in spring durability or fatigue strength are used and covered with copper (Cu) excellent in conductivity, to make up either one or both of the suspension wires, which are the lateral-direction drive suspension wires capable of being energized 15A, 15B, 15C, 15D, 15E, 15F, 15G, 15H, 15I, 15J, 15K, and 15L and the longitudinal-direction drive suspension wires capable of being energized 25A, 25B, 25C, 25D, 25E, 25F, 25G, and 25H.

As a high-strength copper-plated steel wife for precision spring excellent in strength characteristics and conductivity characteristics, Mac Wire (trademark) by Marubishi Co., Ltd. can be cited, for example. As specific Mac Wire (trademark) products, Mac Wire CP: CP-SWPA, CP-SWPB, etc., can be cited, for example. A diameter of the high-strength copper-plated steel wire for precision spring can be selected from within a range from 0.02 to 0.8 mm, for example.

As a plurality of lenses 6 and 7, there are used the Fresnel lens 6 made of synthetic resin for outgoing light through which outgoing laser light passes, and the Fresnel lens 7 made of synthetic resin for receiving light through which reflected laser light passes.

Since the Fresnel lenses 6 and 7 are formed substantially in a shape of a plate with a small thickness, the Fresnel lenses 6 and 7 are used as the lenses 6 and 7 suitable for reduction in size of the lens driving mechanism 1 for laser radar. For example, since the reflected light is weaker than the outgoing light, in order to capture more reflected light easily, the Fresnel lens 7 made of synthetic resin for receiving light is formed longer in the lateral direction than the Fresnel lens 6 made of synthetic resin for outgoing light.

By forming the Fresnel lens 6 by providing "sawtooth-shaped" steps (not shown), for example, on the surface 6a (front face 6a) of a lens board 6b substantially in a rectangular thin plate shape, the Fresnel lens 6 for outgoing light capable of enlarging/adjusting the outgoing laser light as appropriate is formed while being the thin substantially plate-shape lens 6. By forming the Fresnel lens 7 by providing "sawtooth-shaped" steps (not shown), for example, on the surface 7a (front face 7a) of a lens board 7b substantially in a rectangular thin plate shape, the Fresnel lens 7 for receiving light capable of focusing the reflected laser light as appropriate is formed while being the thin substantially plate-shape lens 7.

By forming each of the Fresnel lenses 6 and 7 using a synthetic resin material, a weight of the Fresnel lenses 6 and 7 can be reduced. There is efficiently mass-produced the Fresnel lens 6 made of synthetic resin for outgoing light, which is formed in a complicated shape by forming, e.g., the "sawtooth-shaped" steps, not shown, on the surface 6a of the lens board 6b substantially in the rectangular thin plate shape, based oh the injection molding method. There is efficiently mass-produced the Fresnel lens 7 made of synthetic resin for reflected light formed in a complicated shape by forming, e.g., the "sawtooth-shaped" steps, not shown, on the surface 7a of the lens board 7b substantially in the rectangular thin plate shape, based on the injection molding method. Mass production of the Fresnel lenses 6 and 7 is enabled, so that the prices of the Fresnel lenses 6 and 7 can be lowered.

When a plurality of curve-shaped convex lenses (not shown) are formed by using glass as a material, for example, there is fear that the size and weight of the convex lens can not be easily reduced. However, by manufacturing the Fresnel lenses 6 and 7 by using a transparent or translucent synthetic resin material based on the injection molding method excellent in mass-production performance, manufacture/processing of the Fresnel lenses 6 and 7 are easily conducted, so that the prices of the Fresnel lenses 6 and 7 can be lowered and thin and light-weight lenses 6 and 7 are formed.

By forming the Fresnel lenses 6 and 7 using the synthetic resin material based on the injection molding method, the lens driving mechanism 1 for laser radar is reduced in size and weight and made compact, and is made up as the lens driving mechanism 1 for laser radar whose price can be reduced, for example. After the Fresnel lenses 6 and 7 made of synthetic resin are formed based on the injection molding method, by making up the lens driving mechanism 1 for laser radar provided with the lens integrated portion 10 including a plurality of Fresnel lenses 6 and 7, which are the Fresnel lens 6 made of synthetic resin for outgoing light used when the outgoing laser light passes therethrough and the Fresnel lens 7 made of synthetic resin for receiving light used when the reflected laser light passes therethrough, there can be provided the size-reduced, light-weighted, compact, and cost-down lens driving mechanism 1 for laser radar which can be reduced in size and weight and made compact, and of which price can be reduced.

For example, a transparent or translucent thermoplastic heat-resistant synthetic resin material capable of injection molding is used to form the lenses 6 and 7. To be more specific, the lenses 6 and 7 are formed by using composition which includes highly transparent acrylic/methacrylate resin excellent in weather resistance, mirror-surface smoothness, plate-thickness accuracy, etc. as a base material, for example. A compound name of the methacrylate resin is polymethyl methacrylate and the polymethyl methacrylate is abbreviated as PMMA, for example. Also, the methacrylate resin is called as acrylic resin. The lenses (6 and 7) are formed by using composition including polycarbonate resin excellent in processability and capable of price reduction as a base material, for example. The polycarbonate is abbreviated as PC, for example. The parentheses with reference numerals in this description are used for convenience for describing those slightly different from those illustrated in figures, etc. (except the directions D1 and D2).

The lenses 6 and 7 are formed by using the composition including PMMA resin as a base material, for example. The compositions having PMMA as the base material include Acrypet (registered trademark) by Mitsubishi Rayon Co., Ltd, for example. For example, Acrypet VH001, V001 by Mitsubishi Rayon Co., Ltd., etc., are cited as specific PMMA. The Specific gravities of the Acrypet VH001 and V001 by Mitsubishi Rayon Co., Ltd. are approximately 1.19. The Specific gravity of the composition, etc., including a synthetic resin material as a base material is obtained by a test method based on "ASTM D792", "ISO1183", "JIS K 7112", for example. Total light transmittance of Acrypet VH001 by Mitsubishi Rayon Co., Ltd. by the test method based on "JIS K 7361" is approximately 92.5%, for example. The total light transmittance of Acrypet V001 by Mitsubishi Rayon Co., Ltd. by the test method based on "JIS K 7361" is approximately 93%, for example.

The lenses 6 and 7 are formed by using the composition including PC as a base material, for example. The compositions having PC as a base material include Panlite (registered trademark) by Teijin Chemicals Co., Limited, etc. For example, Panlite AD-5503 by Teijin Chemicals Co., Limited can be cited as specific PC. The specific gravity of Panlite AD-5503 is approximately 1.2, for example. The light transmittance of Panlight AD-5503 by Teijin Chemicals Co., Limited by the test method based on "ASTM D 1003" (thickness: 3 mm) is approximately 89%, for example.

If the lenses 6 and 7 are formed by using the transparent or translucent thermoplastic heat-resistant synthetic resin material capable of injection molding, response characteristics of the lens driving mechanism 1 for laser radar are improved. The resin materials have specific gravity smaller than metal materials, for example and considered to be suitable for enabling weight reduction. While the specific gravity of glass is approximately 2.2 to 2.8 and the specific gravity of lead glass is approximately 3.4 to 4.28, for example, the specific gravity of PMMA is approximately 1.16 to 1.2. The specific gravity of PC is approximately 1.2 and the specific gravity of PC with filler is approximately 1.4 to 1.43. If the lenses 6 and 7 are formed by using the transparent or translucent thermoplastic heat-resistant synthetic resin material capable of injection molding, the weights of the lenses 6 and 7 can be reduced. By forming the lenses 6 and 7 by using a synthetic resin material, the weight of the lens integrated portion 10 provided with the lenses 6 and 7 is reduced, and as a result of this, the lens integrated portion 10 becomes able to move easily. Since the lens integrated portion 10 achieves light weight to become able to move easily, the response characteristics of the lens driving mechanism 1 for laser radar provided with the lens integrated portion 10 are improved.

If the light-weighted lens integrated portion 10 is supported by the intermediate support portion 20, the intermediate support portion 20 supporting the lens integrated portion 10 becomes easier to move and as a result, the response characteristics of the lens driving mechanism 1 for laser radar are improved.

Light transmittance or transparency of the transparent synthetic resin material forming the lenses 6 and 7 is approximately 80% or more and equal to 100% or less, preferably approximately 85% or more and 100% or less, or more preferably approximately 88% or more and 100% or less, for example. If the light transmittance or transparency of the transparent synthetic resin material farming the lenses 6 and 7 is at a low value Less than approximately 80%, for example, efficiency of light passing through the lenses 6 and 7 is lowered, which is not preferable. If the light transmittance or transparency of the transparent synthetic resin material forming the lenses 6 and 7 is preferably at a high value of approximately 85% or more, or more preferably approximately 88% or more, for example, it becomes easy to avoid a decrease in efficiency of light passing through the lenses 6 and 7. The lenses 6 and 7 are preferably formed by a composition including the transparent synthetic resin material with a high value of light transmittance or transparency. It is ideal that the light transmittance or transparency of the transparent synthetic resin material forming the lenses 6 and 7 is at a value of approximately 100% or a value close to substantially 100%, for example.

According to design/specification of the lens driving mechanism 1 for laser radar, there is used the Fresnel lens 6 made of synthetic resin for outgoing light which is provided with substantially sawtooth-shaped steps, not shown, formed with accuracy on the surface 6a with performing press molding on the lens board 6b formed of a composition including a synthetic resin material such as PMMA as a base material. According to design/specification of the lens driving mechanism 1 for laser radar, there is used the Fresnel lens 7 made of synthetic resin for reflected light which is provided with substantially sawtooth-shaped steps, not shown, formed with accuracy on the surface 7a with performing press molding on the lens board 7b formed of a composition including a synthetic resin material such as PMMA as a base material. The above Acrypet V001 by Mitsubishi Rayon Co., Ltd., etc., for example, can be cited as the PMMA base material used for the lens boards 6b and 7b at this time.

The optical-member mounted portion 11 is formed by using a thermoplastic heat-resistant synthetic resin material capable of injection molding. The relay portion body 21 is formed by using the thermoplastic heat-resistant synthetic resin material capable of injection molding.

To be more specific, the lens holder 11 and/or the intermediate support portion body 21 are formed by using a composition including, as a base material, liquid crystal polymer (LCP) which is excellent in thin moldability, heat resistance when performing soldering, etc., and injection moldability, and enables weight reduction rather than an iron material, etc., does, for example. Wholly aromatic liquid crystal resins excellent in heat resistance, for example, can be cited as the liquid crystal polymer.

To be more specific, Sumika Super (registered trademark) by Sumitomo Chemical Co., Ltd., etc., is cited as a composition including, as a base material, a liquid crystal polymer of the type I excellent in heat resistance. Sumika Super (registered trademark) products include E5008L, E6008. For example, the specific gravity of "Sumika Super E5008L" by Sumitomo Chemical Co., Ltd., is approximately 1.69, and the specific gravity of "Sumika Super E6008" by Sumitomo Chemical Co., Ltd. is approximately 1.7.

Xydar (registered trademark) by Nippon Oil Corporation, for example, is cited as the liquid crystal polymer of the type I excellent in heat resistance. The Xydar (registered trademark) products include the 300 series, 400 series, RC, FC series. To be more specific, the Xydar (registered trademark) products include GradeM-350, GradeM-450, GradeFC-110, GradeFC-120. For example, the specific gravity of Xydar "GradeM-350" and "GradeM-450" by Nippon Oil Corporation is approximately 1.84, and the specific gravity of Xydar "GradeFC-110" by Nippon Oil Corporation is approximately 1.7.

Vectra (registered trademark) by Polyplastics Co., Ltd., for example is cited as a composition including the liquid crystal polymer of the type II as a base material. The Vectra (registered trademark) products include Grade A410, S471. For example, the specific gravity of Vectra "Grade A410" by Polyplastics Co., Ltd. is approximately 1.84, and the specific gravity of Vectra "Grade S471" by Polyplastics Co., Ltd. is approximately 1.77.

The LCPs of the type I and type II are wholly aromatic liquid crystal polyesters, for example. Since the LCPs of the type I, etc., are excellent in thin moldability and heat resistance when performing soldering, etc., this is considered as a material suitable for forming the lens holder 11 and/or the intermediate support portion body 21, for example.

The lens holder 11 and/or the intermediate support portion body 21 is formed by using a composition including a base material of polyarylene sulfide (PAS) resin such as polyphenylene sulfide (PPS), etc., which is excellent in heat resistance, injection moldability, electric characteristics such as insulation characteristic, mechanical characteristics, dimension stability, etc., and enables weight reduction rather than an iron material, etc., does, for example.

DIC (registered trademark) by PIC (former company name: Dainippon Inki Kagaku Kogyo), for example, is cited as a Composition including PPS as a base material. To be specific, there are cited, for example, "DIC-PPS FZ-2100" by DTC, which is an unreinforced Linear PPS, "DIC-PPS FZ-2130" by DIC, which is a 30% glass-fiber reinforced linear PPS, "DIC-PPS FZ-1140-D9" by DIC, which is a 40% glass-fiber reinforced crosslinked PPS, as a composition including a base material of PPS. The specific gravity of "DIC-PPS FZ-2100" by DIC is approximately 1.35, and the specific gravity of "DIC-PPS FZ-2130" by DIC is approximately 1.56, and the specific gravity of "DIC-PPS FZ-1140-D9" by DIC is approximately 1.66, for example.

A molded body formed of the straight-chain PPS (Linear PPS) composition having high elongation and excellent toughness, for example. On the other hand, a molded body formed of a crosslinked PPS composition has higher modulus of elasticity as compared with that of the molded body formed of the straight-chain PPS composition, for example. A molded body formed by a semi-crosslinked PPS composition has the characteristics of both of the molded body formed of a linear PPS composition the molded body formed of a crosslinked PPS composition, for example.

The lens holder 11 and/or the intermediate support portion body 21 is formed, for example, by using a composition including a base material of ketone resin such as polyetheretherketone resin, which is excellent in strength characteristic, heat resistance when performing soldering, etc., and injection moldability and enables weight reduction rather than an iron material, etc., does. The ketone resins include polyetheretherketone resin, polyaryletherketone resin. The polyetheretherketone is abbreviated as PEEK (registered trademark), and the polyaryletherketone is abbreviated as PAEK, for example.

There is cited "VICTREX (registered trademark) PEEK (registered trademark)" produced by Victrex pic, UK and distributed by Victrex Japan (former name: Victrex-MC, Inc.), for example, as a composition including a PEEK material as a base material. VICTREX (registered trademark) products include "VICTREX PEEK 450G", "VICTREX M1000", and "VICTREX M2000". The specific gravity of "VICTREX PEEK 450GL30" produced by Victrex plc, UK and distributed by Victrex Japan, is approximately 1.51, and the specific gravity of "VICTREX M1000" produced by Victrex plc, UK and distributed by Victrex Japan is approximately 1.35, the specific gravity of "VICTREX M2000" produced by Victrex plc, UK and distributed by Victrex Japan is approximately 1.37, for example.

At least one of the optical-member mounted portion 11 and the relay portion body 21 is formed by using a composition including at least one or more types of the thermoplastic heat-resistant synthetic resin material capable of injection molding to be selected from a group including LCP, PPS, and PEEK, for example. Either one or both of the optical-member mounted portion 11 and the relay portion body 21 may be formed by using a composition including at least one or more types of the thermoplastic heat-resistant synthetic resin material capable of injection molding to be selected from a group including LCP or PPS, for example, according to design/specification of the driving apparatus for laser radar. Either one or both of the optical-member mounted portion 11 and the relay portion body 21 may be formed by using a composition including at least one or more types of the thermoplastic heat-resistant synthetic resin material capable of injection molding to be selected from a group including PPS or PEEK, for example, according to design/specification of the driving apparatus for laser radar, either one or both of the optical-member mounted portion 11 and the relay portion body 21 may be formed by using a composition including at least one or more types of the thermoplastic heat-resistant synthetic resin material capable of injection molding to be selected from a group including PEEK or LCP, for example, according to design/specification of the driving apparatus for laser radar.

If the optical-member mounted portion 11 is formed by using the thermoplastic heat-resistant synthetic resin material capable of injection molding and the relay portion body 21 is formed by using the thermoplastic heat-resistant synthetic resin material capable of injection molding, the response characteristics of the optical-member driving apparatus 1 for laser radar are improved. The resin material has a specific gravity smaller than that of the metal material, for example, and considered to be suitable for enabling weight reduction. While the specific gravity of iron is approximately 7.85 to 7.87, for example, the specific gravity of LCP is approximately 1.27 to 1.4 and the specific gravity of LCP with filler is approximately 1.55 to 1.96, for example. The specific gravity of PPS is approximately 1.35 to 1.42 and the specific gravity of PPS with filler is approximately 1.56 to 2, for example. The specific gravity of PEEK is approximately 1.3 and the specific gravity of PEEK with filler is approximately 1.4 to 1.55, for example. If the optical-member mounted portion 11 and the relay portion body 21 are formed by using a composition including the thermoplastic heat-resistant synthetic resin material capable of injection molding, the optical-member mounted portion 11 and the relay portion body 21 can achieve light weight.

By forming the optical-member mounted portion 11 by using the synthetic resin material, the optical-member integrated portion 10 provided with the optical-member mounted portion 11 can achieve light weight and thus, the optical-member integrated portion 10 becomes able to move easily. If the light-weighted optical-member integrated portion 10 is supported by the relay portion 20, the relay portion 20 supporting the optical-member integrated portion 10 becomes able to move easily. By forming the relay portion body 21 by using the synthetic resin material, the relay portion 20 provided with the relay portion body 21 can achieve light weight and thus, the relay portion 20 becomes able to move easily. Since the optical-member integrated portion 10 and the relay portion 20 achieve light weight to become able to move easily, the response characteristics of the optical-member driving apparatus 1 for laser radar provided with the optical-member integrated portion 10 and the relay portion 20 are improved.

Each of components making up the optical-member driving apparatus 1 for laser radar such as the optical members 6 and 7, the optical-member mounted portion 11, the relay portion body 21, etc., is formed by using the thermoplastic heat-resistant synthetic resin material excellent in moldability, based on the injection molding method with excellent mass-production capability. If each of the components making up the optical-member driving apparatus 1 for laser radar such as the optical members 6 and 7, the optical-member mounted portion 11, the relay portion body 21, etc., is formed based on the injection molding method, the components can be mass-produced efficiently even if they are in complicated shapes.

Each of the components making up the optical-member driving apparatus 1 for laser radar such as the optical members 6 and 7, the optical-member mounted portion 11, the relay portion body 21, etc., is formed by using a composition including the thermoplastic heat-resistant synthetic resin material which is capable of injection molding and which has a specific gravity of approximately 0.8 or more and 2 or less, specifically a specific gravity of approximately 0.83 or more and 1.98 or less, for example.

If each of the components making up the optical-member driving apparatus 1 for laser radar such as the optical members 6 and 7, the optical-member mounted portion 11, the relay portion body 21, etc., is formed by using a composition including the thermoplastic heat-resistant synthetic resin material which is capable of injection molding and which has a specific gravity of 2 or less, the optical-member driving apparatus 1 for laser radar can achieve light weight. Since each of the components such as the optical members 6 and 7, the optical-member mounted portion 11, the relay portion body 21, etc., there is configured the optical-member driving apparatus 1 for laser radar with improved response characteristics.

Since each of the components such as the optical members 6 and 7, the optical-member mounted portion 11, the relay portion body 21, etc., can achieve light weight, there is reduced a load applied on each of the suspension wires 15A, 15B, 15C, 15D, 15E, 15F, 15G, 15H, 15I, 15J, 15K, 15L, 25A, 25B, 25C, 25D, 25E, 25F, 25G, 25H with a small diameter.

If each of the components such as the optical members 6 and 7, the optical-member mounted portion 11, the relay portion body 21, etc., is formed by using a composition having a specific gravity greater than approximately 2, for example, operating characteristics of the optical-member integrated portion 10, the relay portion 20 are degraded so that the load applied on each of the suspension wires 15A, 15B, 15C, 15D, 15E, 15F, 15G, 15H, 15I, 15J, 15K, 15L, 25A, 25B, 25C, 25D, 25E, 25F, 25G, 25H is increased, which is not preferable. It is preferable that the specific gravity of the composition forming each of the components such as the optical members 6 and 7, the optical-member mounted portion 11, the relay portion body 21, etc., is small.

As a composition having a specific gravity close to approximately 2 and including the thermoplastic heat-resistant synthetic resin material capable of injection molding, there can be cited PPS in which a large amount of filler is mixed, for example. The PSS with filler having a specific gravity close to approximately 2 includes Fortron (registered trademark) 6165A6 by Polyplastics Co., Ltd., which is the straight-chain PPS (linear PPS), for example. The specific gravity of Fortron 6165A6 is approximately 1.98. The PSS mixed with filler having a specific gravity of around 2 includes "DIC-PPS FZ-3600-L4" by DIC, which is crosslinked PPS, for example. The specific gravity of "DIC-PPS FZ-3600-L4" is approximately 2.

The specific gravity of the lightest synthetic resin material/composition among the thermoplastic heat-resistant synthetic resin materials capable of injection molding is approximately 0.8 in general, for example. The thermoplastic heat-resistant synthetic resin material/composition which is capable of injection molding and have a specific gravity of approximately 0.8 include polymethylpentene excellent in transparency, heat resistance, etc., for example. The specific gravity of polymethylpentene is approximately 0.83 to 0.84, for example. TPX (registered trademark) RT18, RT31, DX820 by Mitsui Chemicals, Inc., etc., can be cited as polymethylpentene. The "TPX" is an abbreviation of "Transparent Polymer X".

The specific gravity of TPX (registered trademark) RT18, RT31, DX820 by Mitsui Chemicals, Inc., for example, is approximately 0.83. The transparency of TPX (registered trademark) RT18 by Mitsui Chemicals, Inc. by a test method based on "ASTM D 1746", for example, is approximately 94%. The transparency of TPX (registered trademark) RT31, DX820 by Mitsui Chemicals, Inc. by a test method based on. "ASTM D 1746", for example, is approximately 93%.

The PWB body 31A of the first PWB 30A is formed by using a composition including a synthetic resin material excellent in insulation properties. The PWB body 31B of the second PWB 30B is formed by using a composition, including a synthetic resin material excellent in insulation properties. For example, the PWB 30A and 30B are formed such that a circuit conductor, not shown, made of metal is formed on the PWB bodies 31A and 31B made of synthetic resin and an insulating layer (not shown) is provided thereon.

According to the design/specification of the optical-member driving apparatus 1 for laser radar, the relay portion 20 may be formed as PWB (20), for example. According to the design/specification of the optical-member driving apparatus 1 for laser radar, the optical-member mounted portion 11 may be formed as PWB (11), for example.

According to the design/specification of the optical-member driving apparatus 1 for laser radar, a single-layer winding coil can be used for the coils 12A, 12B, 12C, 12D, 12E, 12F, 22A, and 22B, for example. Also, according to the design/specification of the optical-member driving apparatus 1 for laser radar, a multiple-layer winding coil capable of easily obtaining a great driving force can be used for the coils 12A, 12B, 12C, 12D, 12E, 12F, 22A, and 22B, for example. To be specific, a double-layer winding coil capable of easily obtaining a great driving force can be used for the coils 12A, 12B, 12C, 12D, 12E, 12F, 22A, and 22B, for example.

There is formed a wire making up either or both of the coils, which are the coils for driving in the first direction 12A, 12B, 12C, 12D, 12E, and 12F and the coils for driving in the second direction 22A and 22B by using a material including light metal such as an aluminum material or an aluminum alloy material. As the coil wire including light metal such as an aluminum material or an aluminum alloy material, enameled copper-clad aluminum wire by Totoku Electric Co., Ltd., can be cited, for example.

Either or both of the coils, which are the coils for driving in the lateral direction 12A, 12B, 12C, 12D, 12E, and 12F and the coils for driving in the longitudinal direction 22A and 22B is made up by using a conductor with an insulating coating material. To be specific, there is used a self-bonding enameled CCAW made up such that a copper-clad aluminum wire easily permitting weight reduction is coated with an insulating material such as ah enamel material to make up either or both of the coils, which are the coils for driving in the lateral direction 12A, 12B, 12C, 12D, 12E, and 12F and the coils for driving in the longitudinal direction 22A and 22B. The copper-clad aluminum wire is abbreviated as CCAW. The self-bonding enameled CCAW includes an aluminum or an aluminum alloy material making up a conductor main body portion, a copper material making up an outer layer portion of the conductor main body portion, and an insulating and/or self-bonding material Such as an enamel material making up an outer periphery portion of the copper material. A coating formed from the insulating material is formed by using polyurethane resin, class B soldered enamel resin, soldered polyesterimide resin, for example. The coating by a self-bonding material is formed by using alcohol adhesive resin, hot-air adhesive resin, for example.

The CCAW is a magnet wire made up as a composite light-weighted material. Since a CCAW main body portion is made up from the aluminum and aluminum alloy material at the center part in a cross section of the CCAW, the conductor can be reduced in weight. When using the CCAW having the same diameter as that of the copper wire, for example, the weight of the CCAW is approximately one third of that of the copper wire. Since a layer of the copper material is made up around the aluminum and aluminum alloy material making up the center part in the cross section of the CCAW, the CCAW is excellent in soldering performance and corrosion resistance. The CCAW includes those having the conductor main body portion formed from aluminum, HCCAW (high-tension copper-Clad aluminum wire) having the conductor main body portion formed from the aluminum alloy, UCCAW (ultra high-tension copper-clad aluminum wire) having the conductor main body portion formed from the aluminum alloy, etc. The specific gravities of CCAW, HCCAW, UCCAW are approximately 3 to 3.7, for example.

If forming the wire making up either or both of the coils, which are the coils for driving in the first direction 12A, 12B, 12C, 12D, 12E, and 12F and the coils for driving in the second direction 22A and 22B by using a material including light metal such as the aluminum material or the aluminum alloy material, the response characteristics of the optical-member driving apparatus 1 for laser radar are improved. The material including light metal such as the aluminum material or the aluminum alloy material has a specific gravity smaller than that of other metal materials, for example, and is considered to be suitable for realizing weight reduction. For example, while the specific gravity of iron is approximately 7.85 to 7.87 and the specific gravity of copper is approximately 8.92 to 8.95, the specific gravity of aluminum is approximately 2.71. The specific gravity of aluminum is approximately one third of that of iron or copper, for example. If forming the wire making up the coils for driving in the first direction 12A, 12B, 12C, 12D, 12E, and 12F and the coils for driving in the second direction 22A and 22B by using a material including light metal such as the aluminum material or the aluminum alloy material, there can be reduced in weight the coils for driving in the first direction 12A, 12B, 12C, 12D, 12E, and 12F and the coils for driving in the second direction 22A and 22B.

By forming the wire making up the coils for driving in the first direction 12A, 12B, 12C, 12D, 12E, and 12F by using the material including light metal, the optical-member integrated portion ID including the coils for driving in the first direction 12A, 12B, 12C, 12D, 12E, and 12F can be reduced in weight, and as a result, the optical-member, integrated portion 10 can move easily. If the light-weighted optical-member integrated portion 10 is supported by the relay portion 20, the relay portion 20 supporting the optical-member integrated portion 10 becomes able to move easily. By forming the wire making up the coils for driving in the second direction 22A and 22B by using the material including light metal, the relay portion 20 including the coils for driving in the second direction 22A and 22B is reduced in weight, and as a result, the relay portion 20 becomes able to move easily. Since the optical-member integrated portion 10 and the relay portion 20 are reduced in weight and become able to move easily, the response characteristics of the optical-member driving apparatus 1 for laser radar including the optical-member integrated portion 10 and the relay portion 20 are improved.

According to the design/specification of the optical-member driving apparatus 1 for laser radar, coils in other forms (not shown) may be used instead of the coils 12A, 12B, 12C, 12D, 12E, 12F, 22A, and 22B, for example. As the coil (12A, 12B, 12C, 12D, 12E, 12F, 22A, 22B), there may be used a coil made up such that a circuit conductor is plating-processed on a board provided with a resin layer portion such as a glass layer portion, an epoxy resin layer portion, etc., for example. A print coil considered as such coils may be used, for example. Such coils include FP coil (registered trademark) by Asahi Kasei Corporation, for example.

By using the print coils (12A, 12B, 12C, 12D, 12E, 12F), the coils (12A, 12B, 12C, 12D, 12E, 12F) are easily mounted on the lens holder (11). By using the coils (12A, 12B, 12C, 12D, 12E, 12F) made up such that the circuit conductor is plating-processed on the board, a mounting work of the coils (12A, 12B, 12C, 12D, 12E, 12F) on the lens holder (11) becomes easy. Since the mounting work of the coils (12A, 12B, 12C, 12D, 12E, 12F) to the lens holder (11) becomes easy, an assembling work of the optical-member driving apparatus (1) for laser radar is carried out easily.

By using the print coils (22A, 22B), the coils (22A, 22B) can be easily mounted on the intermediate support portion body (21). By using the coils (22A, 22B) made up such that the circuit conductor is plating-processed on the board, mounting work of the coils (22A, 22B) on the intermediate support portion body (21) is carried out easily, and thus the assembling work of the optical-member driving apparatus (1) for laser radar is conducted easily.

Since the assembling work of the optical-member driving apparatus (1) for laser radar is carried out easily, the price of the optical-member driving apparatus (1) for laser radar can be reduced.

The ultraviolet curing adhesives 13, 23, 33, and 43 as one type of the electron-beam curing adhesives 13, 23, 33, and 43 include optical UV adhesives NOA60, NOA83H, etc., by Norland Products Inc. The ultraviolet curing adhesives 13, 23, 33, and 43 such as optical UV adhesives NOA60, NOA83H, etc., are acrylic and one-component ultraviolet curing adhesives 13, 23, 33, and 43. The acrylic ultraviolet curing adhesives 13, 23, 33, and 43 have a short curing time and can be cured within several seconds. The "UV" is an abbreviation for "ultraviolet". The ultraviolet curing adhesive is referred to as a UV curing adhesive. According to the design/specification of the optical-member driving apparatus 1 for laser radar, those having the adhesion process with use of a two-component ultraviolet curing adhesive (13, 23, 33, 43) is performed therefor, for example, can, be also used. The two-component ultraviolet curing adhesive (13, 23, 33, 43) includes two-component epoxy ultraviolet curing adhesive (13, 23, 33, 43).

Magnetic members, not shown, corresponding to the coils 12A, 12B, 12C, 12D, 12E, 12F, 22A, and 22B include magnets, magnet steel, etc. To be specific, each magnet, not shown, corresponding to each of the coils 12A, 12B, 12C, 12D, 12E, 12F, 22A, 22B is formed by using magnet/magnet steel, for example. The magnet/magnet steel is ferroalloy in which an alloy element such as chromium, aluminum, nickel, and cobalt is added to iron, for example; has permanent magnetic characteristics with high coercivity and high retentivity by quenching and precipitation hardening; and is capable of molding such as rolling. A single bipolar magnet for driving (not shown) in which a positive pole portion is formed on one side on one face and a negative pole portion on the other side on the one face is used, for example. According to the design/specification of the optical-member driving apparatus 1 for laser radar, a single-pole/dipolar magnet or a multipolar magnetized magnet that is a two-pole or more magnetized magnet may be used as the magnetic member, for example.

As a metal magnet, CKSG (registered trademark) by NEOMAX Co., Ltd., CKSR (registered trademark) by NEOMAX Co., Ltd., etc., can be cited, for example. Specific metal magnet materials include CKSC-600 by NEOMAX Co., Ltd., and CKSR-200 by NEOMAX Co., Ltd.

According to the design/specification of the optical-member driving apparatus 1 for laser radar, each magnet may be formed by using a permanent magnet material, for example. A magnet may be formed by using a ferrite magnet which is inexpensive, has a large coercivity and is difficult to be demagnetized, for example.

A magnetic connection member to which each of magnetic members such as magnet/magnet steel is attached is formed by using a metal material to which a magnetic material is attracted. For example, the magnetic connection member is formed by performing press work such as punching, bending for a thin steel plate such as a rolled steel plate. To be specific, by using a metal material plate having iron as a main component such as a rolled steel plate, for example, the magnetic connection member, so-called yoke, is punched/bent to be formed by a press molding machine. As the metal material plate having iron as a main component, stainless steel plate, rolled steel plate, band steel, etc., can be cited, for example. As a cold rolled steel plate and band steel, SPCC, SPCD, SPCE, etc., specified based on "JIS G 3141" can be cited.

There is used environment-friendly solder, so-called lead-free solder, which does not contain lead, as a soldering material when soldering the suspension wires 15A, 15B, 15C, 15D, 15E, 15F, 15G, 15H, 15I, 15J, 15K, 15L, 25A, 25B, 25C, 25D, 25E, 25F, 25G, and 25H, coils 12A, 12B, 12C, 12D, 12E, 12F, 22A, and 22B, etc. If the lead-free solder is used as the soldering material, when a laser radar apparatus including the optical-member driving apparatus 1 for laser radar is disassembled to be disposed of, for example, an influence of lead on the natural environment can be avoided. As the lead-free solder, Ecosolder (registered trademark) by Senju Metal Industry Co., Ltd., etc., can be cited. To be specific, as the lead-free solder, Ecosolder M30 by Senju Metal Industry Co., Ltd., etc., can be cited.

The laser radar apparatus including the optical-member driving apparatus 1 for laser radar is preferably provided for movable means such as an automobile, for example. To be specific, the laser radar apparatus including the optical-member driving apparatus 1 for laser radar of wire support type is mounted on an automobile, for example, and is used when measuring a distance to the target by applying laser light to a target from the automobile side to detect the return laser light reflected from the target.

For example, the laser radar apparatus including the optical-member driving apparatus 1 for laser radar is preferably used by being connected to a collision prevention alarm device for preventing a vehicle provided with the laser radar device from colliding with a vehicle in front of the vehicle provided with the laser radar device (none of which is shown). For example, a distance between a vehicle and the one ahead and a relative speed are swiftly calculated from a running speed of the vehicle provided with the laser radar device based on the laser light emitted from a laser radar light emitting/receiving device on the front side of the vehicle to be reflected, for example. The running speed of the vehicle ahead is reduced relative to that of the vehicle provided with the laser radar device, and when a value of the actually measured distance between vehicles which is smaller than a value of the preset distance is detected, there are issued a caution signal, a danger signal, etc., from ah alarm lamp, an alarm speaker, etc., to a driver, for example.

Also, the Laser light emitted from the laser radar light emitting/receiving device on the front side of the vehicle is applied to and reflected from various reflection members provided in advance on a road shoulder in a sharp curve, school road, pedestrian crossing, etc. and the reflected laser light is returned to the laser radar light emitting/receiving device on the front side of the vehicle so that the caution signal, danger signal, etc., is issued by the alarm lamp, alarm speaker, etc., to the driver, for example.

Also, the laser radar device including the optical-member driving apparatus 1 for laser radar is mounted on a driver-assist system device which enables a vehicle provided with the laser radar device to run while keeping an appropriate distance between the vehicle provided with the laser radar device and the vehicle ahead all the time, for example. As the driver-assist system device, an active cruise control device can be cited, for example.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical-member driving apparatus for laser radar, comprising:
    an optical-member integrated portion including an optical member and an optical-member mounted portion having the optical member mounted thereon;
    first erection members supporting the optical-member integrated portion;
    a relay portion to which the first erection members is connected;
    second erection members supporting the relay portion;
    a fixed portion to which the second erection members are connected,
    the optical-member integrated portion and the relay portion connected by the first erection members capable of exerting high rigidity against a force substantially in the longitudinal direction, and
    the relay portion and the fixed portion connected by the second erection members that is bent flexibly when applied with a force substantially in the longitudinal direction.

2. The optical-member driving apparatus for laser radar according to claim 1, wherein
    the first erection members connecting the optical-member integrated portion and the relay portion, and the second erection members connecting the relay portion and the fixed portion are different in rigidity in at least one of a lateral and longitudinal directions.

3. The optical-member driving apparatus for laser radar according to claim 1, wherein
    the optical-member integrated portion and the relay portion are connected by a plurality of the first erection members, and each of the first erection members is disposed at a different angle; and
    the relay portion and the fixed portion are connected by a plurality of the second erection members, and each of the second erection members is disposed at a different angle.

4. An optical-member driving apparatus for laser radar, comprising:
    an optical-member integrated portion including an optical member and an optical-member mounted portion having the optical member mounted thereon;
    first erection members supporting the optical-member integrated portion;
    a relay portion to which the first erection members is connected;
    second erection members supporting the relay portion; and
    a fixed portion to which the second erection members are connected,
    wherein the optical-member integrated portion and the relay portion are connected by the first erection members bent flexibly when applied with a force substantially in the lateral direction; and
    the relay portion and the fixed portion are connected by the second erection members capable of exerting high rigidity against a force substantially in the lateral direction.

5. An optical-member driving apparatus for laser radar, comprising:
    an optical-member integrated portion including an optical member and an optical-member mounted portion having the optical member mounted thereon;
    first erection members supporting the optical-member integrated portion;
    a relay portion to which the first erection members is connected;
    second erection members supporting the relay portion; and
    a fixed portion to which the second erection members are connected,
    wherein when an optical-member driving structure for laser radar provided with the first erection members and the second erection members is viewed from above, the optical-member integrated portion and the relay portion are connected via the plurality of first erection members by extending a plurality of the first erection members substantially in parallel between the optical-member integrated portion and the relay portion; and
    the relay portion and the fixed portion are connected via the plurality of second erection members by extending a plurality of the second erection members inclined substantially in a truncated chevron state between the relay portion and the fixed portion.

6. An optical-member driving apparatus for laser radar, comprising:
    an optical-member integrated portion including an optical member and an optical-member mounted portion having the optical member mounted thereon;
    first erection members supporting the optical-member integrated portion;
    a relay portion to which the first erection members is connected;
    second erection members supporting the relay portion; and a fixed portion to which the second erection members are connected, wherein when an optical-member driving structure for laser radar provided with the first erection members and the second erection members is viewed on the side, the optical-member integrated portion and the relay portion are connected via the plurality of first erection members by extending a plurality of the first erecting members inclined substantially in a truncated chevron state between the optical-member integrated portion and the relay portion; and the relay portion and the fixed portion are connected via a plurality of the second erection members by extending a plurality of the second erection members substantially in parallel between the relay portion and the fixed portion.

7. The optical-member driving apparatus for laser radar according to claim 1, wherein the optical-member integrated portion is located on the front side;

the relay portion is located on the rear side; and the fixed portion is located between the optical-member integrated portion and the relay portion.

8. The optical-member driving apparatus for laser radar according to claim 1, wherein suspension wires formed substantially in a linear state are used as the first and second erection members.

9. An optical-member driving apparatus for laser radar, comprising:

an optical-member integrated portion including an optical member and an optical-member mounted portion having the optical member mounted thereon;

first erection members supporting the optical-member integrated portion;

a relay portion to which the first erection members is connected;

second erection members supporting the relay portion; and a fixed portion to which the second erection members are connected, wherein the first erection members connecting the optical-member integrated portion and the relay portion, and the second erection members connecting the relay portion and the fixed portion being different in rigidity in at least one of a lateral and longitudinal directions.

10. The optical-member driving apparatus for laser radar according to claim 1, wherein the optical-member integrated portion and the relay portion are connected by the first erection members bent flexibly when applied with a force substantially in the lateral direction; and the relay portion and the fixed portion are connected by the second erection members capable of exerting high rigidity against a force substantially in the lateral direction.

11. The optical-member driving apparatus for laser radar according to claim 1, wherein when an optical-member driving structure for laser radar provided with the first erection members and the second erection members is viewed from above, the optical-member integrated portion and the relay portion are connected via the plurality of first erection members by extending a plurality of the first erection members substantially in parallel between the optical-member integrated portion and the relay portion; and the relay portion and the fixed portion are connected via the plurality of second erection members by extending a plurality of the second erection members inclined substantially in a truncated chevron state between the relay portion and the fixed portion.

12. The optical-member driving apparatus for laser radar according to claim 1, wherein when an optical-member driving structure for laser radar provided with the first erection members and the second erection members is viewed on the side, the optical-member integrated portion and the relay portion are connected via the plurality of first erection members by extending a plurality of the first erecting members inclined substantially in a truncated chevron state between the optical-member integrated portion and the relay portion; and the relay portion and the fixed portion are connected via a plurality of the second erection members by extending a plurality of the second erection members substantially in parallel between the relay portion and the fixed portion.

* * * * *